(12) United States Patent
Sakura

(10) Patent No.: US 8,767,226 B2
(45) Date of Patent: Jul. 1, 2014

(54) PRINTING SYSTEM, CONTROL METHOD, INFORMATION PROCESSING APPARATUS, AND COMPUTER-READABLE MEDIUM

(75) Inventor: Masayuki Sakura, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 169 days.

(21) Appl. No.: 13/363,797

(22) Filed: Feb. 1, 2012

(65) Prior Publication Data

US 2012/0212760 A1      Aug. 23, 2012

(30) Foreign Application Priority Data

Feb. 17, 2011   (JP) .................. 2011-032632

(51) Int. Cl.
  *G06F 3/12*   (2006.01)
  *G06K 15/00*  (2006.01)
  *H04N 1/46*   (2006.01)
(52) U.S. Cl.
  USPC ......... 358/1.13; 358/1.15; 358/1.16; 358/508
(58) Field of Classification Search
  None
  See application file for complete search history.

(56) References Cited

U.S. PATENT DOCUMENTS

| | | | |
|---|---|---|---|
| 6,070,000 A | 5/2000 | Mori | |
| 6,607,314 B1 * | 8/2003 | McCannon et al. | 400/62 |
| 7,454,482 B2 * | 11/2008 | Barnard et al. | 709/220 |
| 7,471,405 B2 * | 12/2008 | Sabbagh et al. | 358/1.15 |
| 8,477,346 B2 * | 7/2013 | Legan | 358/1.15 |
| 2006/0002352 A1 | 1/2006 | Nakamura | |
| 2007/0076253 A1 * | 4/2007 | Shima | 358/1.15 |
| 2008/0174812 A1 | 7/2008 | Lee et al. | |
| 2010/0171973 A1 * | 7/2010 | Kimura | 358/1.14 |
| 2010/0208298 A1 | 8/2010 | Kitagata | |
| 2010/0245885 A1 * | 9/2010 | Selvaraj | 358/1.15 |
| 2010/0259787 A1 | 10/2010 | Nagashima | |
| 2011/0013215 A1 * | 1/2011 | Yonezawa et al. | 358/1.14 |

FOREIGN PATENT DOCUMENTS

| | | | |
|---|---|---|---|
| JP | 2002-366502 A | 12/2002 | |
| JP | 2006-134245 A | 5/2006 | |

OTHER PUBLICATIONS

HP Universal Print Driver—Solution and Feature Guide Copyright 2009.*
European Search Report issued in corresponding application No. 12154425.8 mailed on Sep. 9, 2013.

* cited by examiner

*Primary Examiner* — Thomas Lett
(74) *Attorney, Agent, or Firm* — Carter, DeLuca, Farrell & Schmidt, LLP

(57) ABSTRACT

An information processing apparatus comprises a first installer for installing a driver corresponding to the image output apparatus, wherein the first installer is executed to install, in the information processing apparatus, a first driver and a second installer for installing a second driver, the installed first driver includes: unit configured to generate a first print queue to connect to a first connection port of the image output apparatus; unit configured to transmit an address acquisition request and acquire an address of a second connection port of the image output apparatus; and unit configured to, upon accepting an instruction to generate a second print queue using the print server as a connection destination, launch the second installer to install the second driver, and generate the second print queue, and the launched second installer generates the second print queue using the address of the second connection port that is acquired.

11 Claims, 18 Drawing Sheets

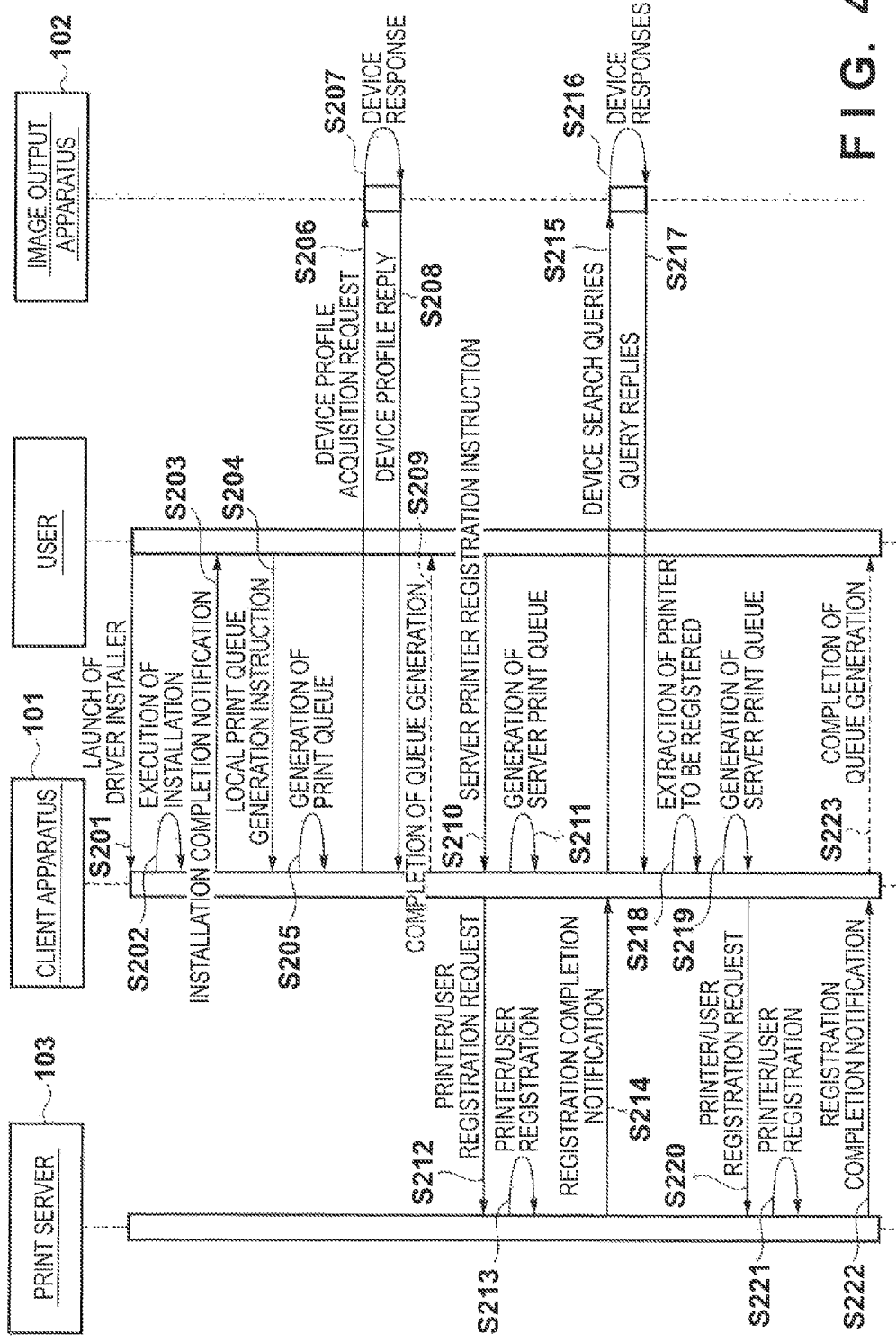

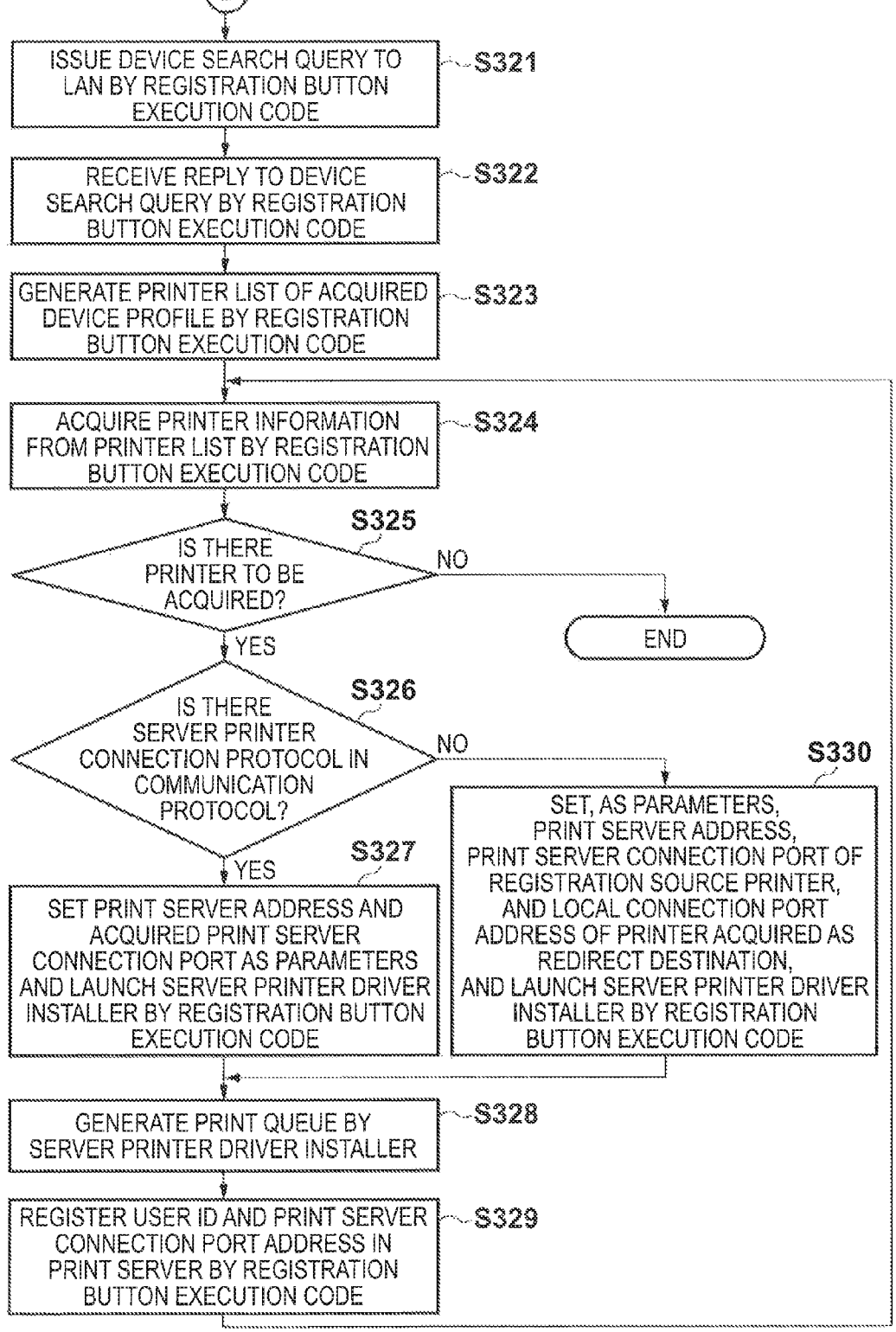

| 701 | HARDWARE ID | 16bdd1fc6-810f-11d0-bec7-08002be2092f |
| --- | --- | --- |
| 702 | MAC ADDRESS | AA-BB-CC-DD-EE-01 |
| 703 | IP ADDRESS | 192.168.0.10 |
| 704 | COMMUNICATION PROTOCOL | LPR, IPP, Port9100, SNMP |
| 706 | VENDOR | ABC |
| 707 | PRINTER NAME | Printer A |
| 708 | PRINT SERVICE ADDRESS | http://printerA.abc.jp/ |
| 709 | MAXIMUM PAPER SIZE | A3 |
| 710 | MONOCHROME COLOR | COLOR |

PRINTING SYSTEM, CONTROL METHOD, INFORMATION PROCESSING APPARATUS, AND COMPUTER-READABLE MEDIUM

BACKGROUND OF THE INVENTION

1. Field of the Invention

The present invention relates to a printing system, a control method, an information processing apparatus, and computer-readable medium. Specifically, the present invention relates to a method of installing a printer driver and generating a print queue in a printing system including an image output apparatus, print server, and client apparatus which are connected to a network.

2. Description of the Related Art

When a client apparatus is to output an image using a network-connected image output apparatus, it is necessary to install a printer driver corresponding to the image output apparatus in the client apparatus and register a print queue. This operation generally adopts the following method. The user acquires and executes a printer driver installer, installing a printer driver. Then, he registers the print queue of an image output apparatus for use in the system.

A network-connected image output apparatus often employs a plurality of connection protocols and can cope with various connection forms. For example, a client apparatus is directly connected to an image output apparatus via a local network using a protocol such as LPR (Line PRinter daemon protocol). Also, a client apparatus, print server, and image output apparatus can be connected via an Internet print server using IPP (Internet Printing Protocol) or the like.

From various connection forms, the user needs to install and set a printer driver by himself at much expense in time and effort.

To solve this, Japanese Patent Laid-Open No. 2002-366502 discloses a method of searching by a client apparatus for a printer in the same segment, automatically downloading and installing a printer driver from a web site or the like, and adding a print queue. In a method disclosed in Japanese Patent Laid-open No. 2006-134245, a client apparatus searches for a printer and presents the result to the user. Then, a printer driver for a printer selected by the user is automatically acquired from a predetermined server and installed. Further, the print queue is registered, and print settings are made.

However, even when the user has already registered a print queue on a local network and uses an image output apparatus, he may want to connect this image output apparatus in another connection form and print. For example, the user uses an Internet print service in addition to printing via the local network connection. By using the image output apparatus via the Internet print service, the user can print from the image output apparatus even in a network environment where he cannot print via the local network connection. For example, assume that the user uses a local network-connected image output apparatus from a notebook type client apparatus in the office. When the user moves the client apparatus to a different network environment, no packet may reach the designated image output apparatus via the local network connection, failing to print. In this case, by designating printing via the Internet print service, the user can obtain an output from the image output apparatus.

In this case, a print queue for connecting to the Internet print service needs to be additionally registered in the client apparatus, in addition to a print queue for the local network connection. Upon the additional registration, the print queue in the client apparatus is connected to the Internet print service, and the print server and image output apparatus are connected.

In this manner, even after the print queue of a given image output apparatus has already been registered, the user may want to additionally register a print queue in accordance with the application purpose. In a conventional technique, the user needs to prepare again another installer corresponding to a different connection method, launch the installer again, and set another connection form. It is cumbersome for the user to acquire and execute an installer again, set a connection, and register a print queue.

SUMMARY OF THE INVENTION

According to one aspect of the present invention, there is provided a printing system in which a print server, a client apparatus, and an image output apparatus are connected via a network, wherein the image output apparatus includes a first connection port for local connection and a second connection port for receiving a print job via the print server; reply unit configured to send back an address of the second connection port upon receiving an address acquisition request; and printing unit configured to print a print job received via the first connection port or the second connection port, the print server includes: image output apparatus registration unit configured to register an image output apparatus serving as a transmission destination of a print job; and transmission unit configured to transmit a print job via a designated connection port to the image output apparatus which is set or designated by the print job and registered by the image output apparatus registration unit, the client apparatus includes a first installer for installing a driver corresponding to the image output apparatus, the first installer is executed to install, in the client apparatus, a first driver and a second, installer for installing a second driver, the installed first driver includes: generation unit configured to generate a first print queue to connect to the first connection port of the image output apparatus; address acquisition unit configured to transmit the address acquisition request and acquire the address of the second connection port of the image output apparatus; and execution unit configured to, upon accepting an instruction to generate a second print queue using the print server as a connection destination, launch the second installer to install the second driver, and generate the second print queue, and the launched second installer generates the second print queue using the address of the second connection port that is acquired by the address acquisition unit.

According to another aspect of the present invention, there is provided a control method in a printing system, in which a print server, a client apparatus, and an image output apparatus are connected via a network, the image output apparatus including a first connection port for local connection and a second connection port for receiving a print job via the print server, comprising: in the image output apparatus, a reply step of sending back an address of the second connection port upon receiving an address acquisition request; and a printing step of printing a print job received via the first connection port or the second connection port, in the print server, an image output apparatus registration step of registering an image output apparatus serving as a transmission destination of a print job; and a transmission step transmitting a print job via a designated connection port to the image output, apparatus which is set or designated, by the print job and registered in the image output apparatus registration step, and in the client apparatus including a first installer for installing a driver corresponding to the image output apparatus, the first installer being executed to install, in the client apparatus, a first driver and a second installer for installing a second driver, by the installed first driver, a generation step generating a first print queue to connect to the first connection port of the image output apparatus; an address acquisition step of transmitting the address acquisition request and acquiring the address of the second connection port of the image output apparatus; an execution step of, upon accepting an instruction to generate a second print queue using the print server as a connection destination, launching the second installer to install the second driver, and generating the second print queue; and a step of causing the launched second installer to generate the second print queue using the address of the second connection port that is acquired in the address acquisition step.

According to another aspect of the present invention, there is provided an information processing apparatus connected to a print server and an image output apparatus via a network, comprising a first installer for installing a driver corresponding to the image output apparatus, wherein the first installer is executed to install, in the information processing apparatus, a first driver and a second installer for installing a second driver, the installed first driver includes: generation unit configured to generate a first print queue to connect to a first connection port of the image output apparatus; address acquisition unit configured to transmit an address acquisition request and acquire an address of a second connection port of the image output apparatus; and execution unit configured to, upon accepting an instruction to generate a second print queue using the print server as a connection destination, launch the second installer to install the second driver, and generate the second print queue, and the launched second installer generates the second print queue using the address of the second connection port that is acquired by the address acquisition unit.

According to another aspect of the present invention, there is provided a non-transitory computer-readable medium storing an installer program for installing a driver corresponding to an image output apparatus, wherein the installer program installs, in a computer, a first driver and another installer program for installing a second driver, the installed first driver causes the computer to function as generation unit configured to generate a first print queue to connect to a first connection port of the image output apparatus, address acquisition unit configured to transmit an address acquisition request and acquire an address of a second connection port of the image output apparatus, and execution unit configured to, upon accepting an instruction to generate a second print queue using a print server as a connection destination, launch the other installer program to install the second driver, and generate the second print queue, and the launched other installer program causes the computer to generate the second print queue using the address of the second connection port that is acquired by the address acquisition unit.

According to another aspect of the present invention, there is provided a non-transitory computer-readable medium storing a device driver program causing a computer to function as generation unit configured to generate a first print queue to connect to a first connection port of an image output apparatus, address acquisition unit configured to transmit an address acquisition request and acquire an address of a second connection port of the image output apparatus, and execution unit configured to, upon accepting an instruction to generate a second print queue using a print server as a connection destination, launch an installer program to install a second driver, and generate a second print queue.

According to the present invention, a print queue to connect to a print server is automatically generated by only issuing a registration instruction from the user to the print server. This can obviate a cumbersome operation required in the conventional technique in which, when adding a print queue for print server connection, an installer is acquired again and launched to add a print queue.

A print queue to connect to the print server can be registered even in smother image output apparatus on the same network. Further, even other users registered in a client apparatus can be registered at once in the print server.

Further features of the present, invention will become apparent from the following description of exemplary embodiments (with reference to the attached drawings).

BRIEF DESCRIPTION OF THE DRAWINGS

FIG. 4 is a sequence chart of the overall system;

FIGS. 5A, 5B, and 5C are flowcharts showing processing in the client apparatus;

DESCRIPTION OF THE EMBODIMENTS

<First Embodiment>
[System Configuration]

Figure 1:
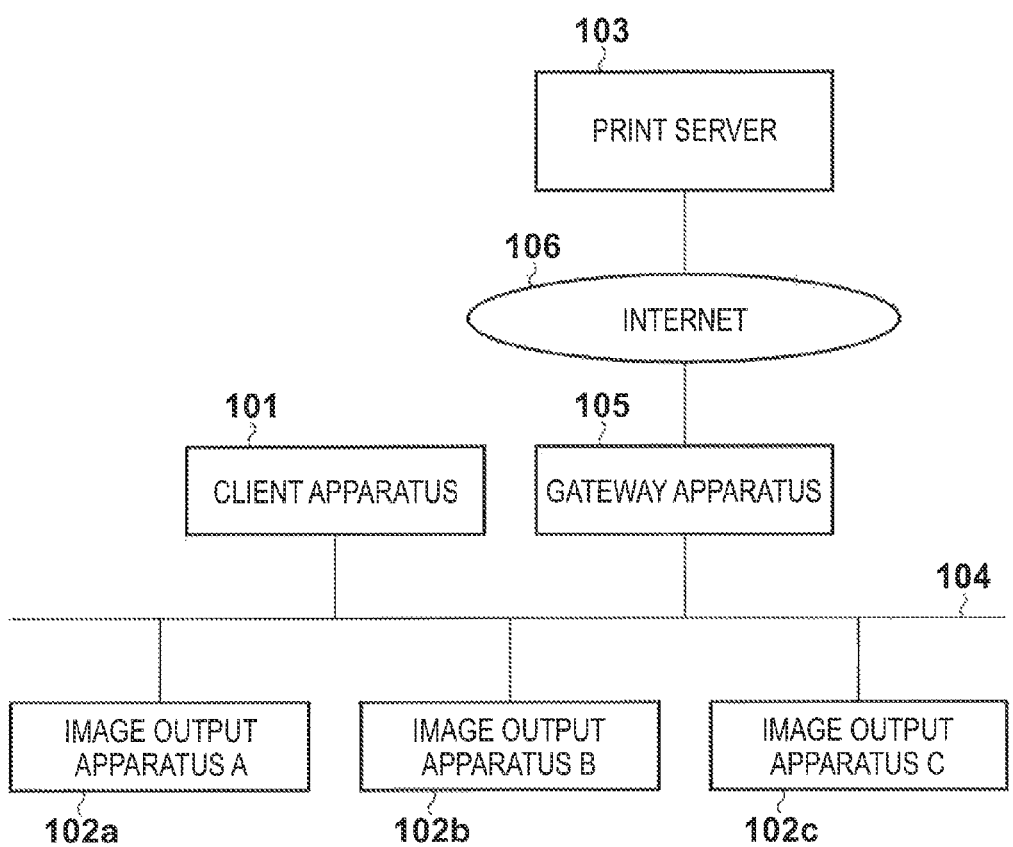
FIG. 1 is a block diagram exemplifying the configuration of a printing system according to the first embodiment.

The first embodiment according to the present invention will now be described with reference to the accompanying drawings. FIG. 1 is a block diagram showing the schematic configuration of a printing system according to the first embodiment of the present invention. The printing system according to the embodiment includes a client apparatus 101 serving as an information processing apparatus which is operated by the user, and a plurality of image output apparatuses 102 which receive and output print jobs. The client apparatus 101 and image output apparatuses 102 are connected via a network 104 formed from Ethernet® or the like. The client apparatus 101 and a print server 103 are connected via a gateway apparatus 105 present on the network 104, and the Internet 106. The image output apparatus 102 receives a print job generated by the client apparatus 101 via the network 104, and prints it. In addition, the image output apparatus 102 can receive even a print job from the print server 103 and print it. In this specification, a plurality of image output apparatuses in the local network (network 104) will be collectively described as "image output apparatuses 102". Each image output apparatus will be individually described as, for example, "image output apparatus A 102*a*". Note that the image output apparatus described in this specification corresponds to a printer or MFP (Multi Function Peripheral) having the print function. In this specification, a simple "network" indicates a local network such as the network 104.

Figure 2:
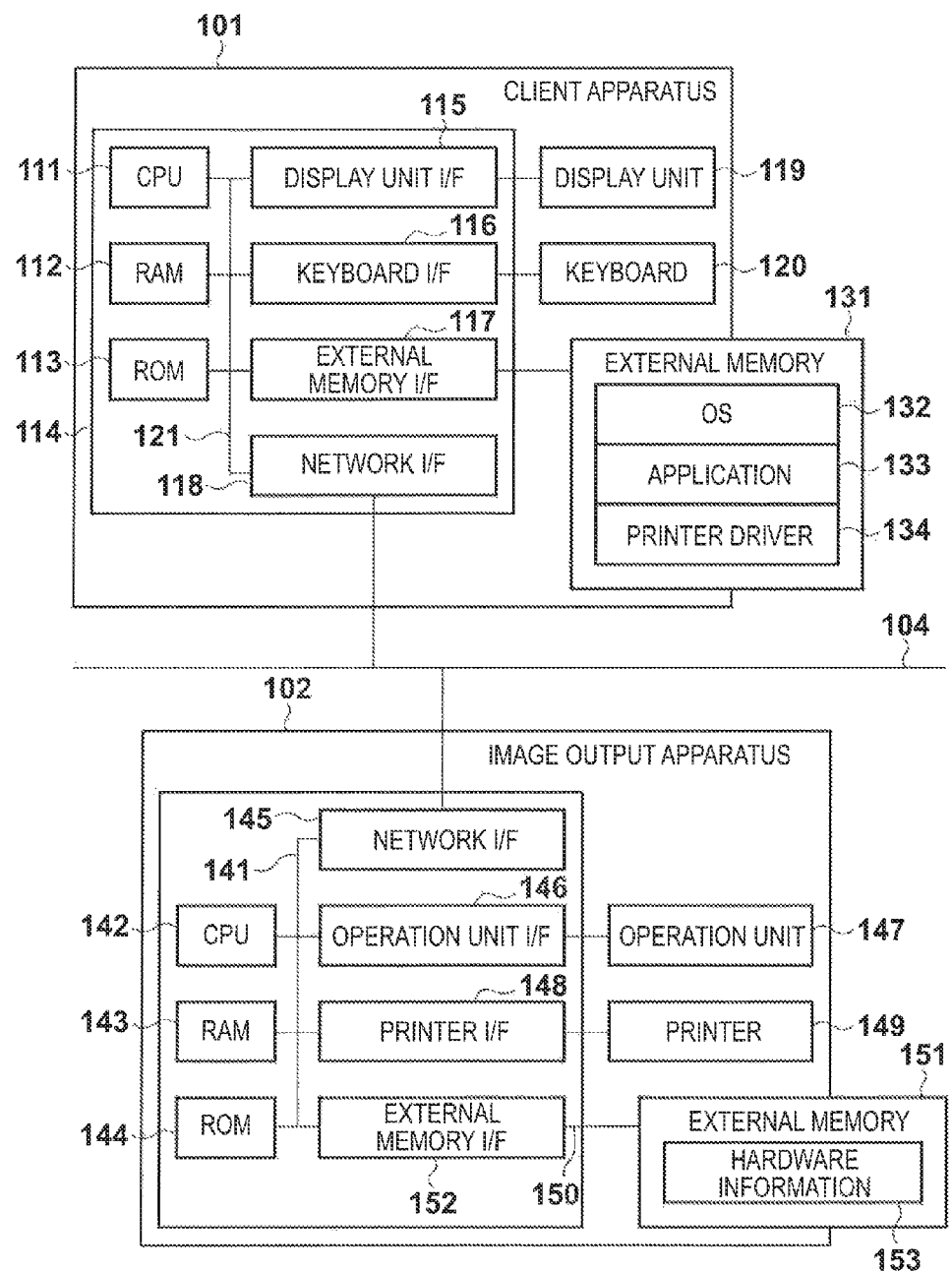
FIG. 2 is a block diagram exemplifying the arrangements of a client apparatus and image output apparatus.

FIG. 2 is a block diagram showing the arrangements of the client apparatus 101 and image output apparatus 102 shown in FIG. 1. In the client apparatus 101, a CPU 111 comprehensively controls devices connected to a system bus 121 in accordance with a program stored in, for example, a RAM 112 serving as a storage unit. The RAM 112 functions even as a main memory, work memory, and the like for the CPU 111. A ROM 113 stores various programs and data. A keyboard I/F 116 controls inputs from a keyboard 120 and a pointing device (for example, touch panel: not shown). A display unit I/F 115 controls display on a display unit 119.

An external memory I/F 117 controls access to an external memory 131 such as a flash memory or SSD (Solid State Disk). The external memory 131 stores an OS (Operating System) 132, an application 133 corresponding to various functions, and a printer driver 134 (print driver program). The external memory 131 functions as a storage medium writable/readable by the client apparatus 101. A network I/F 113 is a control unit for the network 104, and enables connection to the network 104 via a network terminal.

Next, the arrangement of the image output apparatus 102 will be explained. A CPU 142 controls the whole operation of the image output apparatus 102. A RAM 143 functions as a main memory, work memory, and the like for the CPU 142, and is also used as an image information rasterization area and environmental data storage area. The RAM 143 includes even an NVRAM (Non-volatile RAM) area and is configured to expand the memory capacity by an optional RAM connected to an expansion port (not shown). A ROM 144 stores various fonts, control programs and the like to be executed by the CPU 142, and various data.

A network I/F 145 transmits/receives data between the image output apparatus 102 and the client apparatus 101. A printer I/F 148 controls processing with a printer unit 149 serving as a printer engine. An external memory I/F 152 controls access to an external memory 151. The external memory 151 includes a flash memory, SSD, and the like, and can store hardware information 153. Note that when the external memory 151 such as a hard disk is not connected, the ROM 144 stores information and the like to be used in the client apparatus 101.

An operation unit I/F 146 controls processing with an operation unit 147 used to set scan processing of the image output apparatus 102. The operation unit 147 includes an operation panel (not shown) for accepting a user operation, and the operation panel includes a switch, LED display, and the like for the operation. The operation unit 147 may include an NVRAM (not shown) and store print setting information from the operation panel. The CPU 142 can communicate with the client apparatus 101 via the network I/F 145, and receives a print job from the client apparatus 101. In addition, the CPU 142 can notify the client apparatus 101 of information and the like in the image output apparatus 102.

In the embodiment, the network I/F 145 supports a service protocol. The network I/F 145 supports a plurality or protocols such as LPR and Port3100 capable of receiving a print job on a local network as a protocol for receiving a print job, and IPP suited to receive a print job via the Internet. Note that supportable protocols are not limited to the above ones, and a protocol to be supported may be added, as needed. The CPU 142 transmits image data to the printer unit 149 via the printer I/F 148 and executes printing based on a control program or the like stored in the ROM 144 or the like.

Figure 3:
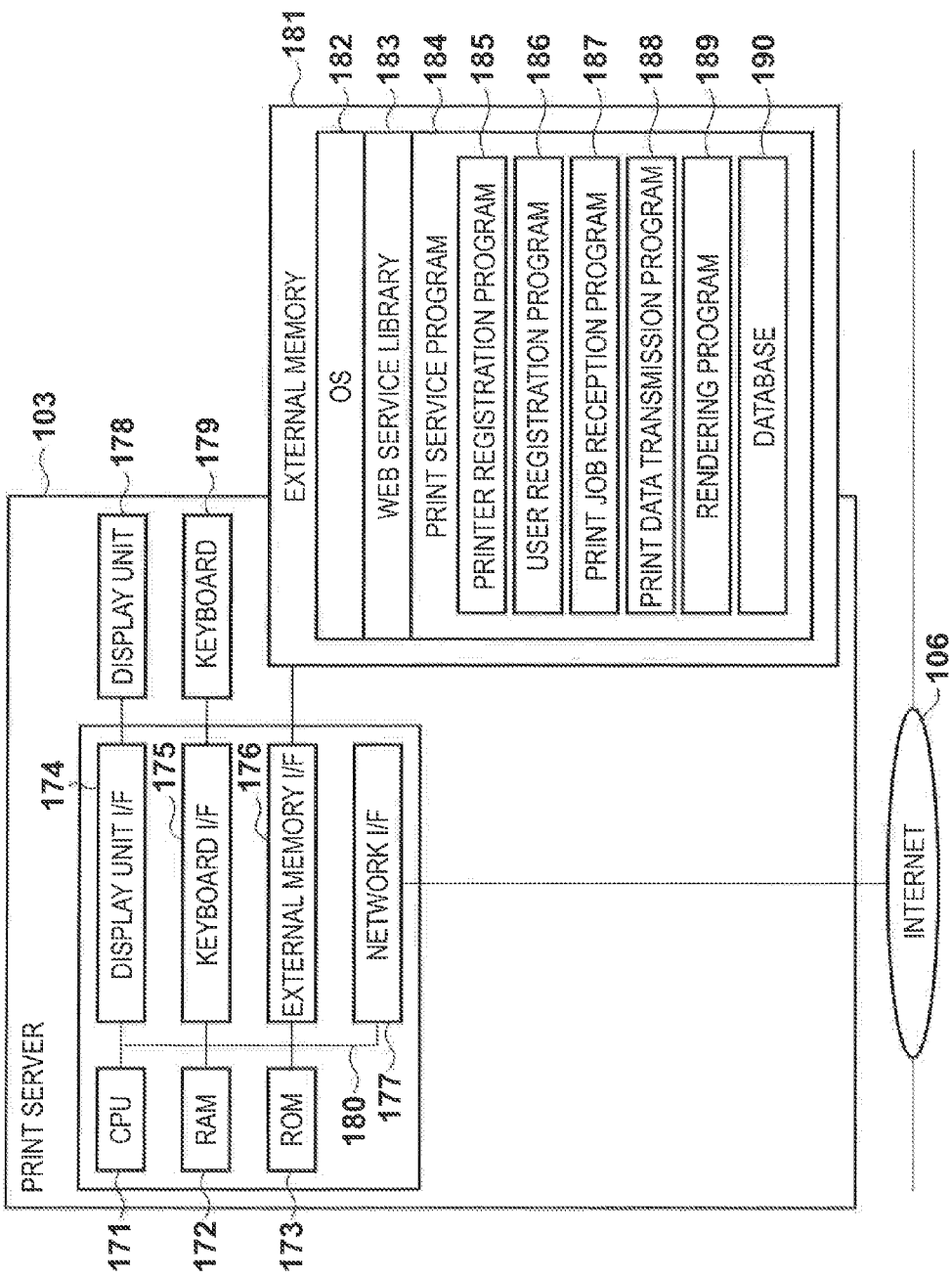
FIG. 3 is a block diagram exemplifying the arrangement of a print server.

The arrangement of the print server 103 will be explained with reference to FIG. 3. In the print server 103, a CPU 171 comprehensively controls devices connected to a system bus 180 in accordance with a program stored in, for example, a RAM 172 serving as a storage unit. The RAM 172 functions even as a main memory, work memory, and the like for the CPU 171. A ROM 173 stores various programs and data. A keyboard I/F 175 controls inputs from a keyboard 179 and a pointing device (for example, mouse: not shown). A display unit I/F 174 controls display on a display unit 178. An external memory I/F 176 controls access to an external memory 181 such as a hard disk (HD) or SSD.

The external memory 181 includes an OS 182, web service library 183, and print service program 184 corresponding to various print service processes. Further, the external memory 181 stores user files, other setting files, and the like, and functions even as a computer-writable/readable database 190. The print service program 184 includes programs such as a printer registration program 185, user registration program 186, print job reception program 187, print data transmission program 188, and rendering program 189.

A network I/F 177 is connected to the client apparatus 101 via the Internet 106, and indirectly performs communication control processing with the image output apparatus 102 connected to the client apparatus 101.

[Processing Sequence in System]

Prior to a description of a processing sequence in each apparatus, processing to be executed between the respective apparatuses will be explained with reference to a sequence chart shown in FIG. 4. After that, processing in each apparatus will be described with reference to a flowchart.

FIG. 4 is a sequence chart showing printer driver install & print queue registration processing according to the embodiment. A series of processes to install a printer driver (device driver program) and register a print queue will be described with reference to FIG. 4. Assume that the client apparatus 101 is already accessible to the image output apparatus 102 via the network 104. Further, the client apparatus 101 is accessible to the print server 103 via the gateway apparatus 105.

In the embodiment, there are two print instruction paths. One is a local connection path for directly issuing an output instruction from the client apparatus 101 to the image output apparatus 102 via the network 104 and outputting an image. In this specification, an image output connection form via this path will be called a "local printer". On the other path, a print job generated by the client apparatus 101 is temporarily transmitted to the print server 103 via the Internet 106. Then, the print server 103 issues an output instruction again to the image output apparatus 102 via the Internet 106, and the image output apparatus 102 outputs an image. In this specification, an image output connection form via this path will be called a "server printer". Note that a printer driver used upon connection as the local printer will be called a "local printer driver" (first driver). A printer driver used upon connection as the server printer will be called a "server printer driver" (second driver).

Also, assume that the user has already acquired a predetermined printer driver installer (installer program), and saves it in the client apparatus 101. The printer driver installer can be acquired by downloading the printer driver installer from the web site of a vendor or loading it by the client apparatus 101 from a CD medium packaged in the product. The arrangement of the printer driver installer will be described in detail after the sequence.

The image output apparatus 102 includes a plurality of connection ports. For example, among the image output apparatuses 102 connected to the network 104, the image output apparatus A 102a includes a local connection port (first connection port) capable of connecting it as a local printer, and a server connection port (second connection port) capable of connection from the print server 103. The "local connection port" allows connection by the TCP/IP protocol such as LPR or Port9100. The "server connection port" allows connection by a protocol conscious of communication via the Internet, such as IPP. Even the image output apparatus B 102b supports the same connection ports as those of the image output apparatus A 102a. Unlike the image output apparatus A 102a and image output apparatus B 102b, the image output apparatus C 102c includes neither a connection port for the print server 103 nor a function of receiving print data from the print server 103. In other words, the image output apparatus C 102c can be connected only as a local printer.

A print queue connected to the local connection port will be referred to as a local print queue (first print queue), and a print queue connected to the server connection port will be referred to as a server print queue (second print queue).

Further, assume that the image output apparatuses 102 can send back device profiles in response to a device information inquiry from the client apparatus 101. More specifically, the client apparatus 101 transmits a device query packet to the network 104 by multicast by SNMP (Simple Network Management Protocol) or the like. In response to this multicast, each image output apparatus sends back a device profile containing its device information. Note that the device profile contains information such as the addresses of the local connection port and server connection port, details of which will be described later.

In step S201, the user designates launch of a printer driver installer on the client apparatus 101. The printer driver installer (first installer) to be launched is an installer containing a local printer driver module set and a server printer driver installer (second installer). A general printer driver installer contains one type of printer driver module, and the installer is launched to install the printer driver module in a client apparatus. However, the printer driver installer launched in step S201 characteristically contains a general local printer driver module, and in addition a server printer driver installer for installing a server printer driver module.

When the printer driver installer is launched, the printer driver installer is executed in the client apparatus 101 in step S202, and a local printer driver module necessary for the local printer is installed. In installation in step S202, a server printer driver installer for the print server 103 is also installed. The server printer driver installer for the print server is used in a subsequent step. Thus, the server printer driver installer is saved in the external memory 131 of the client apparatus 101. The storage location is, for example, a directory where a general application is installed. After the end of installing the printer driver in step S202, the printer driver notifies the user of the completion of installation in step S203. For example, the client apparatus 101 displays a message indicative of the completion on the display unit 119.

Then, the user generates a print queue for actually printing by the image output apparatus 102. First, in step S204, the user instructs the client apparatus 101 to generate a local print queue for using the local printer by using the function of the OS 132. In this case, the user generates the print queue of the image output apparatus A 102a. In response to this generation instruction, a local print queue is generated in the client apparatus 101 in step S205. In step S206, the client apparatus 101 requests the image output apparatus A 102a serving as the connection destination to acquire a device profile by using an execution code executed in generating a print queue. In response to this acquisition request, a connection port address acquisition request is issued. The image output apparatus A 102a responds to the acquisition request from the client apparatus 101 in step S207, and sends back a device profile containing server connection port information to the client apparatus 101 in step S208.

The execution code executed in generating a print queue saves the device profile sent back in step S208 in the external memory 131 of the client apparatus 101. Note that, the storage location is, for example, the registry of the OS 132 or a specific file on the user directory. After that, the client apparatus 101 notifies the user that generation of the local print queue is complete. For example, the client apparatus 101 displays a message indicative of the completion on the display unit 119. When a general local printer is used, generation of the print queue ends after these steps.

However, in the embodiment, a server print queue can be easily generated using device profile information automatically acquired in steps S206 to S208. More specifically, the user opens the local print queue, clicks a "server printer registration" button provided on the local print queue in the embodiment, and can generate a server print queue. In general, a print queue allows arranging a control to execute a vendor-specific execution code.

In step S210, the user opens the local print queue of the image output apparatus A 102a, clicks the "server printer registration" button, and designates registration of a server printer. In step S211, the client apparatus 101 generates a server print queue using the server connection port information acquired in steps S206 to S208 by the execution code corresponding to the "server printer registration" button. In step S212, the client apparatus 101 requests the print server 103 to register the image output apparatus and user. The information to be registered includes connection port information of an image output apparatus serving as the transmission destination when the print server 103 transmits a print job, and the ID of the user of the image output apparatus. These pieces of information are transmitted together with the registration request from the client apparatus 101. Note that the transmitted information is not limited to these pieces of information, and information to be managed in the print server 103 is transmitted, as needed. Handling of the user ID used here will be explained with reference to the flowchart of a software operation in the client apparatus 101 to be described later.

In step S213, the print server 103 registers the image output apparatus and user ID based on information corresponding to the registration request received from the client apparatus 101. This implements an image output apparatus registration unit. In step S214, the print server 103 notifies the "server printer registration" execution code in the client apparatus 101 of the completion of registration. In step S215, the "server printer registration" execution code in the client apparatus 101 transmits a device search query packet by multicast to the network 104. In step S216, upon receiving the multicast packet, the image output apparatus 102 responds to it by transmitting its device profile. In step S217, the "server printer registration" execution code in the client apparatus 101 receives the device profile serving as a query reply from the image output apparatus 102. Since a plurality of image forming apparatuses are arranged on the network 104, a plurality of responses (query replies) to the multicast packet transmitted from the client apparatus 101 are sent back. From the sent-back responses, an image output apparatus 102 which holds a connection port connected to the network 104 can be detected.

In step S218, based on the query replies received from a plurality of image forming apparatuses, the client apparatus 101 checks whether there is an image output apparatus other than one which has been registered in the print server 103 in step S212. The client apparatus 101 extracts an unregistered image output apparatus. In step S219, the "server printer registration" execution code in the client apparatus 101 generates the server print, queue of the unregistered image output apparatus extracted in step S218.

In step S220, similar to step S212, the "server printer registration" execution code requests the print server 103 to register the image output apparatus and user by using the server connection, port information acquired in steps S215 to S217. The information to be registered includes connection port information of an image output apparatus serving as the transmission destination when the print server 103 transmits a print job, and the ID of the user of the image output apparatus. These pieces of information are transmitted together with the registration request from the client apparatus 101.

In step S221, the print server 103 registers the image output apparatus and user ID based on information corresponding to the registration request received from the client apparatus 101. In step S222, the print server 103 notifies the "server printer registration" execution code in the client apparatus 101 of the completion of registration. Finally, in step S223, the "server printer registration" execution code notifies the user that registration of the server print queue in the print server 103 is complete. For example, the client apparatus 101 displays a message indicative of the completion on the display unit 119.

Processing between the apparatuses until the local print queue and server print queue are generated, after the user launches the printer driver installer has been described.

[Processing Sequences]

Processing sequences in the client apparatus 101, print server 103, and image output apparatus 102 will be described in detail. The processes described briefly with reference to FIG. 4 will also be explained in detail for the respective apparatuses with reference to the drawings. The embodiment assumes that the print queues of image output apparatus A, image output apparatus B, and image output apparatus C serving as printer A, printer B, and printer C are registered.

[Processing in Client Apparatus]

Figure 5A:
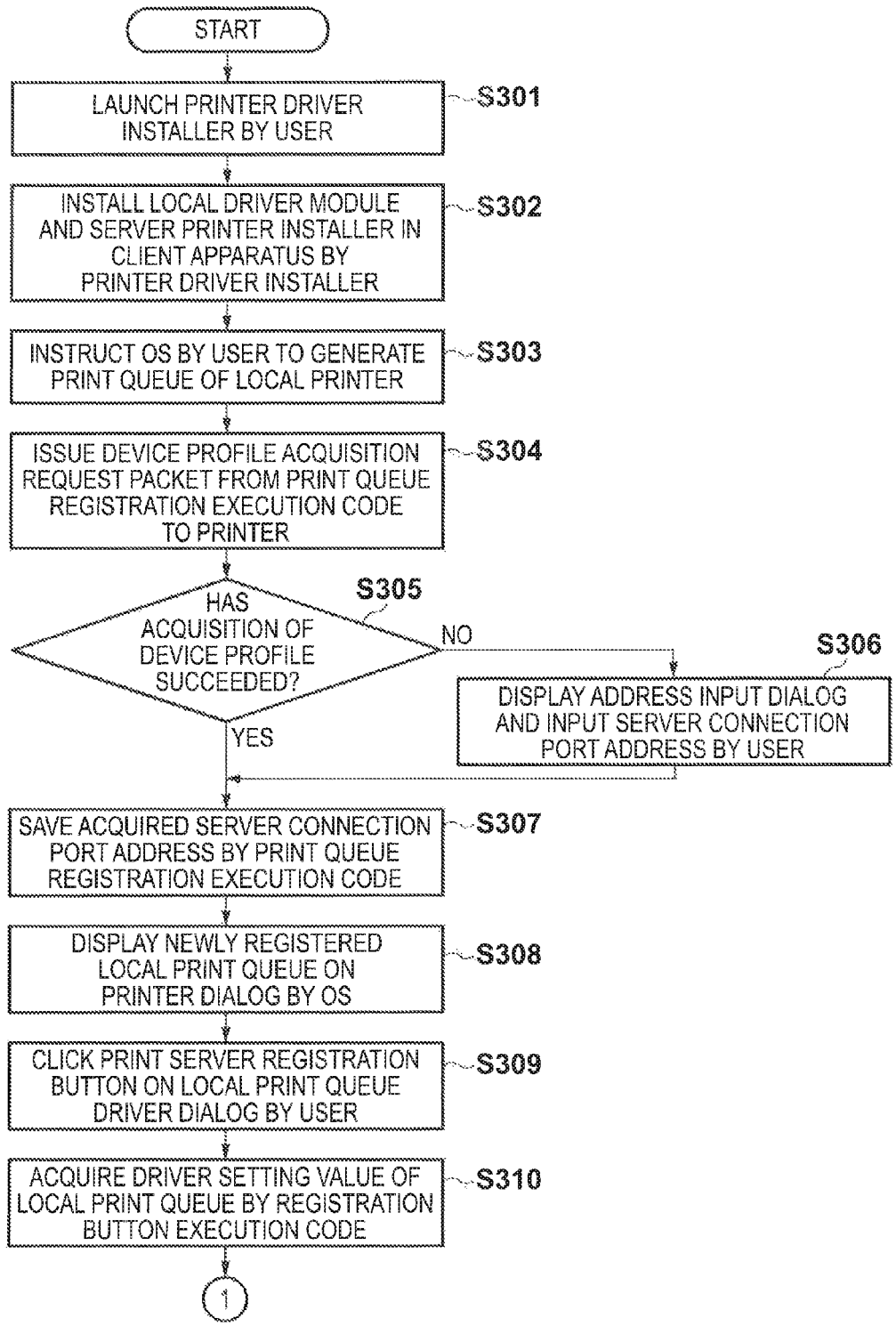
Figure 5B:
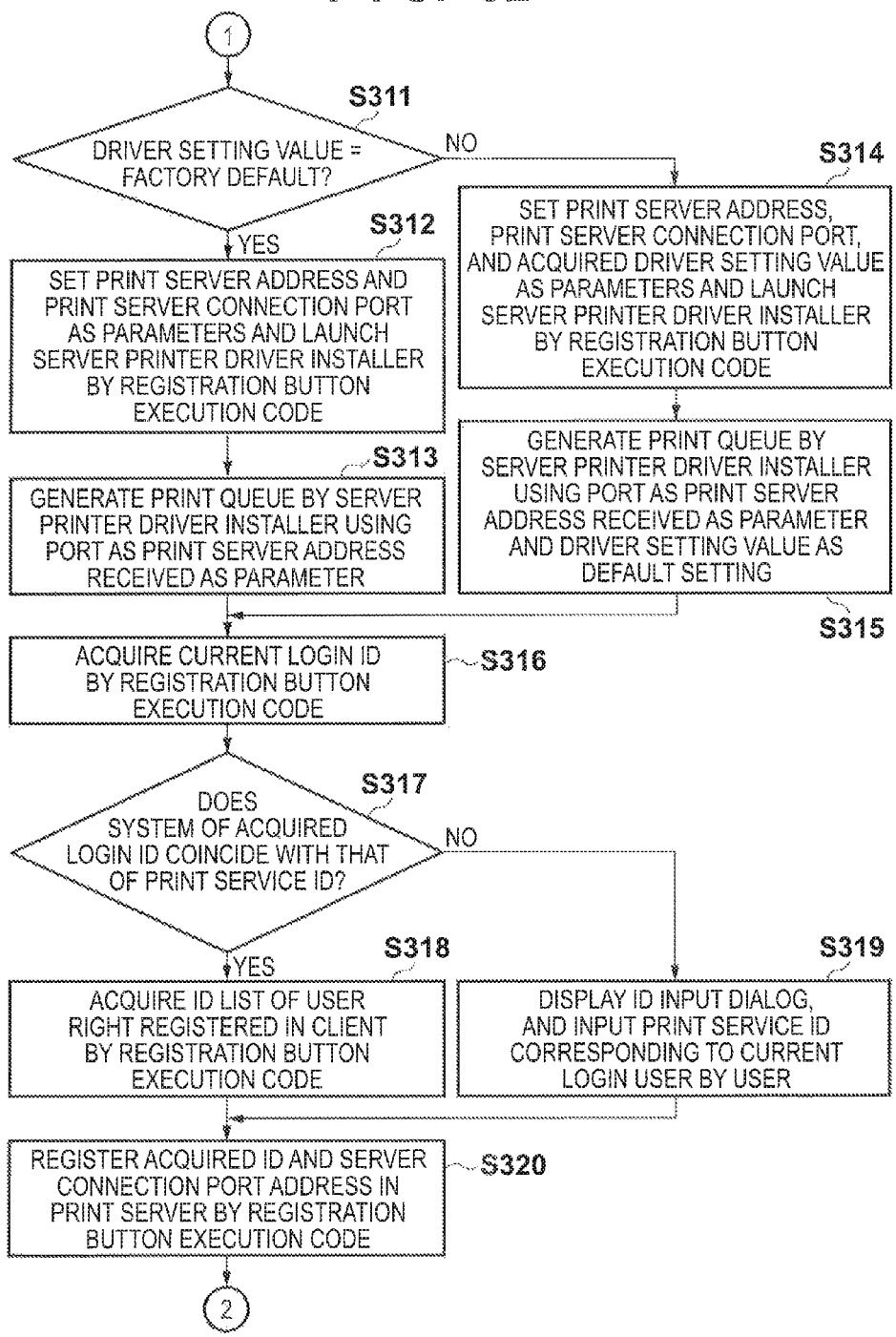

FIGS. 5A, 5B, and 5C are flowcharts showing processing which pays attention to the client, apparatus 101 in the above-described sequence. In step S301, the user launches a printer driver installer acquired in advance in the external memory 131 of the client apparatus 101. The installer launched here is an installer for the local printer driver. In step S302, the printer driver installer installs a local printer driver module and server printer driver installer in the client apparatus 101. At this time, the local printer driver module is installed at a predetermined location of the OS 132. The server printer driver installer is an application to be launched by smother module (to be described later) in a subsequent step, and is saved in a directory capable of launching the server printer driver installer, such as the "/Applications" folder. After the end of installing the printer driver in this step, the printer driver installer may display a message representing the end of installation on the display unit 119 and notify the user of it.

Figure 8A:
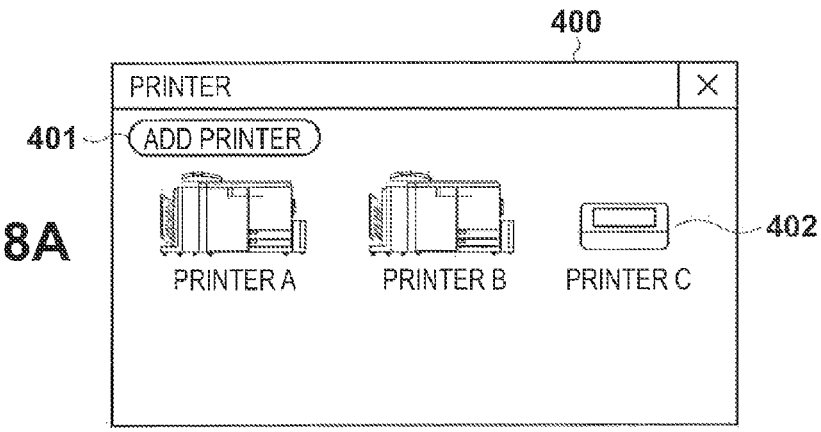
FIGS. 8A, 8B, and 8C are views each exemplifying a printer dialog.

In step S303, the user instructs the OS 132 to generate the print queue of the local printer. FIG. 8A shows a dialog which displays each print queue registered in the OS 132. In FIG. 8A, a printer dialog 400, an add button 401 to designate addition of a print queue, and a list 402 of registered print queues are displayed. Note that the dialog shown in FIG. 8A is merely an example and some OSs adopt other display methods.

When registering a print queue, the user presses the printer add button 401 provided on the printer dialog 400. In response to this instruction, the OS 132 displays a dialog for adding a print queue. On this dialog, the user selects a printer product and designates a connection port. Upon completion of adding the print queue, the printer dialog 400 displays the newly added print queue. Note that a general OS can execute a vendor-specific execution code when adding a print queue. The execution code is provided in the form in which, for example, it is contained in the driver. The purpose of the execution code is, for example, to acquire configuration information from a printer when adding a print queue, and set the print queue in accordance with the acquired configuration information. Also, the execution code can acquire locale information of the running OS 132, set the Letter size as the default setting of the paper size in North America and A4 in other regions.

In step S304, the print queue registration execution code issues a request packet to acquire device profile information of a printer to be connected. This request is issued, using WSD (Web Service on Devices), SNMP MIB (Management Information Base), or the like. In step S303, the execution code determines whether acquisition of the device profile has succeeded. If acquisition of the device profile has succeeded (YES in step S305), the process advances to step S307.

Figures 10, 11:
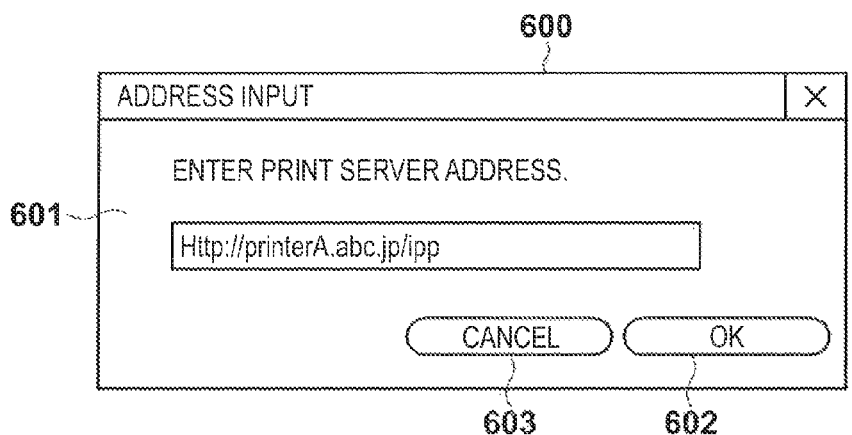
FIG. 10 is a view exemplifying an address input dialog.
FIG. 11 is a table showing information contained in a response packet from the image output apparatus.

FIG. 11 exemplifies information contained in the device profile acquired from the image output apparatus 102 by the print queue registration execution code. In the example shown in FIG. 11, a hardware ID for specifying hardware is "16bdd1fc6-801f-11d0-bec7-08002be2092". This hardware ID (identifier) suffices to uniquely specify an image output apparatus. The device profile contains a MAC address 702, an IP address 703 assigned to the TCP/IP port, and a supported communication protocol 704. In this example, the communication protocol 704 includes LPR, IPP, Port9100, and SNMP. The device profile further contains a vendor name 706, and a vendor "ABC" is set in this example. A printer name 707 is a name set for the image output apparatus, and "Printer A" is set in this example. A print service address 708 is a server connection port address, and "http://printerA.abc.jp/ipp" is designated. Note that the server connection port address is used as a connection port when receiving print, data from the print, server 103. A maximum paper size 709 indicates a maximum paper size printable by the image output apparatus, and is "A3" in this example. A monochrome/color type 710 indicates a color type supported by the image output apparatus, and indicates an image output apparatus coping with "color" in this example.

If acquisition of the device profile has failed (NO in step S305), the process advances to step S306, and the execution code displays an address input dialog via the display unit, and prompts the user to input she server connection port of the image output apparatus 102 whose device profile could not be acquired.

FIG. 10 exemplifies the address input dialog displayed in step S306. In FIG. 10, an address input dialog 600, address input control 601, OK button 602, and cancel button 603 are displayed. For example, when the server connection port address of the image output apparatus 102 connected as a local printer is "http://printerA.abc.jp/ipp", the user inputs it, as shown in FIG. 10. After this input, the user presses the OK button 602 to close the dialog. The print queue registration execution code can acquire the server connection port address of the image output apparatus regardless of whether acquisition of the device profile has succeeded/failed.

In step S307, the print queue registration execution module saves the acquired server connection port in the external memory 131. The storage location may be the registry or sandbox of the OS 132, or the server connection port may be saved as a file in a directory accessible by the print queue registration execution module. In step S308, the OS 132 displays the newly registered local print queue on the printer dialog 400. By this processing, the client apparatus 101 and image output apparatus 102 are locally connected, and the client apparatus 101 can output an image from the image output apparatus 102 via the network 104.

In subsequent steps, a print queue for outputting an image from the client apparatus 101 to the image output apparatus 102 via the print server 103 is registered. Assume that the print queue of a server printer is registered for printer A having a print queue already registered as a local printer.

Figure 9A:
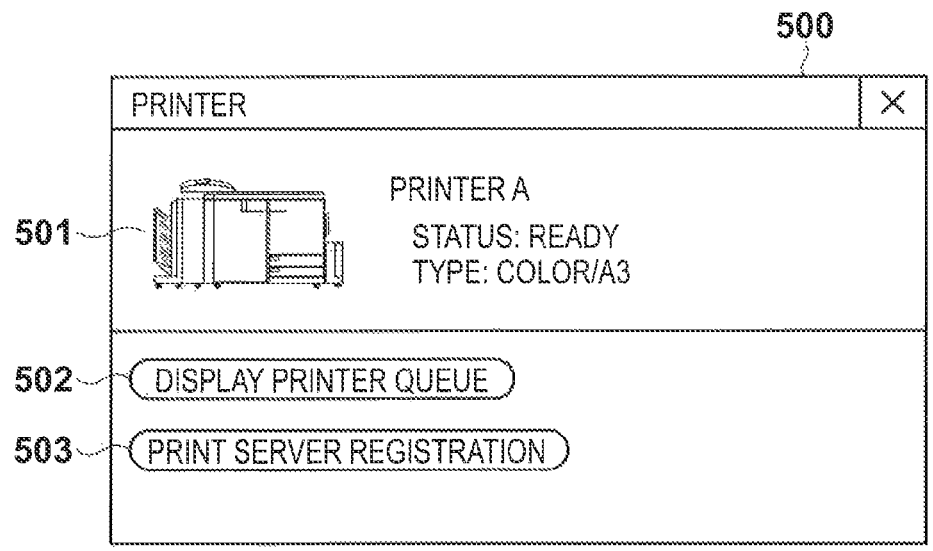
FIGS. 9A and 9B are views each exemplifying a print queue dialog.

In step S309, the user opens the driver dialog of the local print queue and designates generation of a print queue for printing via the print server 103. More specifically, the user displays the printer dialog 400 on the client apparatus 101. Then, the user double-clicks the icon of printer A on the printer dialog 400. By this operation, a print dialog for the print queue of printer A appears. FIG. 9A exemplifies the print dialog of printer A. In FIG. 9A, a print dialog 500 of printer A, summary information 501 of printer A, a display button 502, and a print server registration button 503 are displayed. The summary information 501 is the summary of she image output apparatus. In this example, the outer appearance of printer A, the printer name "printer A", a status representing the printing status of the image output apparatus, and the type of image output apparatus are displayed. The display button 502 is a button for displaying a print queue representing the processing status of a print job. The print server registration button 503 is a button for registering a print queue for connecting to the print server 103.

To register a print queue for printing via the print server 103, the user presses the print server registration button 503. As described above, a vendor-specific execution code which is executed upon pressing the print server registration button 503 can be defined. By this operation, the execution code is executed.

In step S310, the execution code of the print server registration button acquires a value set as the default of the driver of the local print queue. In step S311, the execution code checks whether the acquired driver setting value is a factory default. The factory default is a value which is defined in advance in shipment of the image output apparatus. If the acquired driver setting value is a factory default (YES in step S311), the process advances to step S312. In step S312, the execution code of the print server registration button 503 launches the server printer driver installer, and transfers the address of the print server 103 and the server connection port address of printer A for the print server 103 as parameters. Assume that the execution code of the print server registration button 503 holds in advance the address of the print server 103 for use. This is because the address of the print service provided by the print server 103 is generally defined and rarely changed.

In step S313, the server printer driver installer generates a print queue using, as the output port, the address of the print service provided by the print server 103 which has received the parameters. The server printer driver installer receives the server connection port address of printer A as a parameter. This address is held in the print queue, and when transmitting a print job to the print server 103, is designated in the print job as the address of an image output apparatus which actually outputs an image. The server printer driver installer installs even a server printer driver module which forms the print queue. Note that the timing to install the server printer driver module is not limited to this processing. It suffices to execute the installation until all print queues are registered. The server printer driver module may be installed when the print server registration button 503 is pressed for the first time. Once the server printer driver module is installed, it need not be installed in subsequent processing.

If the driver setting of the local print queue is not a factory default (NO in step S311), the process advances to step S314. The operation in step S314 is almost the same as that in step S312 except that the execution code of the print server registration button transfers the acquired driver setting value to the server printer driver installer as a parameter. The operation in step S315 is the same as that in step S313 except that the driver setting received as a parameter by the server printer driver installer is used as the driver setting of a server print queue to be generated. By this processing, the print queue of the server printer is generated by only pressing the print server registration button 503 on the print queue of printer A by the user.

Figure 8B:
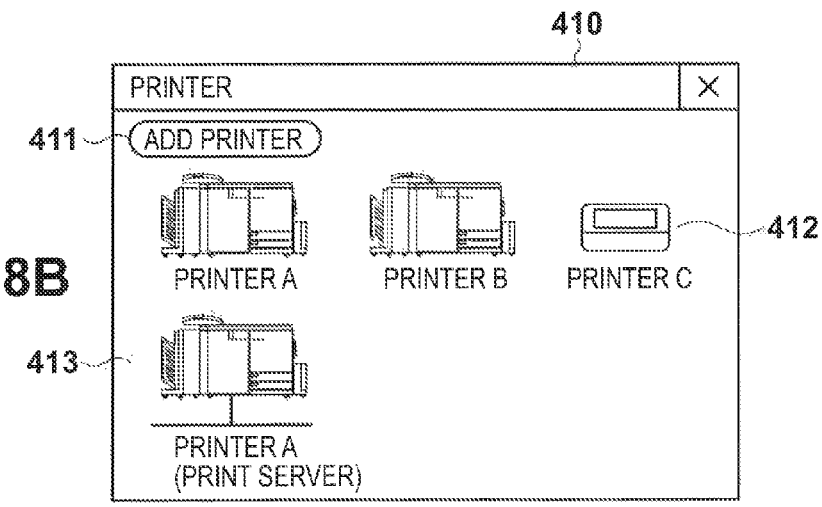

FIG. 8B is a view exemplifying a dialog representing that the server print queue of printer A has been registered. In FIG. 8B, a printer dialog 410, a printer add button 411, and a print queue 412 of registered printer A, printer B, and printer C are displayed. A server print queue 413 newly registered in the above-described steps for printing by printer A via the print server 103 is newly added.

In the following steps, the execution code of the print server registration button subsequently performs processing to provide an additional function.

In step S316, the execution code of the print server registration button acquires the login ID of the user who logs in now. The login ID can be acquired via the system API (Application Programming Interface) of the OS 132 or from the registry or "/usr" directory information. In step S317, the execution code of the print server registration button compares the acquired login ID and a service ID provided by the print server 103 to determine whether they have the same format (ID system). More specifically, by an inquiry to the print service, the execution code of the print server registration button can check whether these formats coincide with each other. The format (system) corresponds to, for example, the usable character count or character format.

If the formats coincide with each other as a result of the comparison (YES in step S317), the execution code of the print server registration button acquires in step S318 information of another login ID having a user right registered in the client apparatus 101. In general, a user who can perform work to change the system, such as print queue registration, is one having an administrator right. To the contrary, a user having a user right cannot perform print queue registration and the like. Therefore, registering a user having a user right in the series of processes can reduce the burden on the administrator. Note that information of a user ID having a user right can be acquired from the registry of the OS 132 or from "/usr" directory information.

If the format of the login ID differs from that of the service ID of the print service (NO in step S317), the acquired login ID cannot be used for use service registration. Hence, in step S319, the execution code of the print server registration button displays an ID input dialog, and prompts the user to enter the print service ID of the print server 103. Note that this dialog is a simple dialog for only entering a user ID, and is not illustrated. In step S320, the execution code of the print server registration button registers, in the print service, the server connection port address of printer A for transmitting a print job from the print server 103. Registration of the user and printer for use in the print service provided by the print server 103 is complete through these steps.

In subsequent steps, the execution code of the print server registration button registers an image output apparatus present on the network 104 other than the image output apparatus A 102a, that is, printer A.

In step S321, the execution code of the print server registration button transmits a device search query packet to the network 104 by multicast. In this step, each image output apparatus sends back a device profile as a reply packet to the query. Note that the device profile is identical to one shown in FIG. 11, and a detailed description thereof will not be repeated.

In step S322, the execution code of the print server registration button receives the device profile sent back from each image output apparatus. In step S323, the execution code of the print server registration button generates a list of the acquired device profiles and image output apparatuses. This list is used to process the image output apparatuses one by one in subsequent loop processing (steps S324 to S331), and is simply the table of a device profile corresponding to the image output apparatus 102, and a detailed description thereof will be omitted.

In step S324, the execution code of the print server registration button acquires information of one printer from the generated printer list. Assume that information of the image output apparatus B 102b is acquired first. Since the list contains information of the image output apparatus to be acquired in step S325 (YES in step S325), the process advances to step S326. In step S326, it is checked whether there is a server printer connection protocol in the corresponding device profile. In this case, the image output apparatus B 102b supports at least IPP as the communication protocol in the device profile. IPP is a server printer connection compatible protocol, so it is determined in step S326 that there is a compatible protocol. Upon this determination (YES in step S326), the process advances to step S327.

In step S327, the execution code of the print server registration button launches the server printer driver installer, and transfers the address of the print server and the server connection port address of printer B for the print server as parameters. Assume that the execution code of the print server registration button holds in advance the address of the print server for use, as described in the above example. In step S328, the server printer driver installer generates a print queue using, as the output port of the print queue, the address of the print service of the print server 103 which has received the parameters. The server printer driver installer receives the server connection port address of printer B as a parameter. This address is held in the print queue, and when transmitting a print job to the print server 103, is designated in the print job as the address of an actual output printer.

In step S323, the execution code of the print server registration button registers, in the print service of the print server 103, the user ID and the address of the server printer connection port which have been acquired in step S316 and step S318 or S319.

Referring back to step S324, the execution code of the print server registration button acquires information of one printer from the generated printer list. Assume that information of the image output apparatus C 102c is acquired. Also, assume that the image output apparatus C 102c does not support a protocol coping with the server printer as a communication protocol, that is, does not support IPP.

Since the list contains information of the image output apparatus to be acquired in step S325 (YES in step S325), the process advances to step S326. In step S326, it is checked whether there is a server printer connection protocol in the corresponding device profile. In this case, the image output apparatus C 102c does not support IPP as the communication protocol in the device profile. IPP is a server printer connection compatible protocol, so it is determined in step S326 that there is no compatible protocol. Upon this determination (NO in step S326), the process advances to step S330. In step S330, the execution code of the print server registration button launches the server printer driver installer. At this time, the execution code of the print server registration button transfers, as parameters, the address of the print server, the server printer connection port address of the registration source print queue, that is, printer A, and the local printer connection port address of printer C serving as an actual job output destination. Assume that the execution code of the print server registration button holds in advance the address of the print server for use, as described in the above example.

In step S328, the server printer driver installer generates a print queue using, as the output port of the print queue, the address of the print service of the print server 103 which has received the parameters. The server printer driver installer receives the server connection port address of printer A as a parameter. This address is held in the print queue, and when transmitting a print job to the print server 103, is designated in the print job as the address of an image output apparatus which actually outputs an image.

In this case, the image output apparatus A 102a receives a print job from the print service. However, the server printer driver installer has received, as a parameter, the local connection port address of the image output apparatus C 102c serving as an actual output destination. The print queue generated in this case designates, as print job attributes, the image output apparatus A 102a as the transmission destination of a print job from the print service, and the image output apparatus C 102c as an actual printout destination. In this case, the print server 103 transmits a print job to the image output apparatus A 102a. However, this job is output from the image output apparatus C 102c. Thus, the image output apparatus A 102a functions as a proxy and transfers the received print job to the image output apparatus C 102c. In step S329, the execution code of the print server registration button registers, in the print service of the print server 103, the user ID and the address of the server printer connection port which have been acquired in step S316 and step S318 or S319.

Referring back to step S324 again, no printer information to be acquired remains in the printer list (NO in step S325), so the process ends.

Figure 8C:
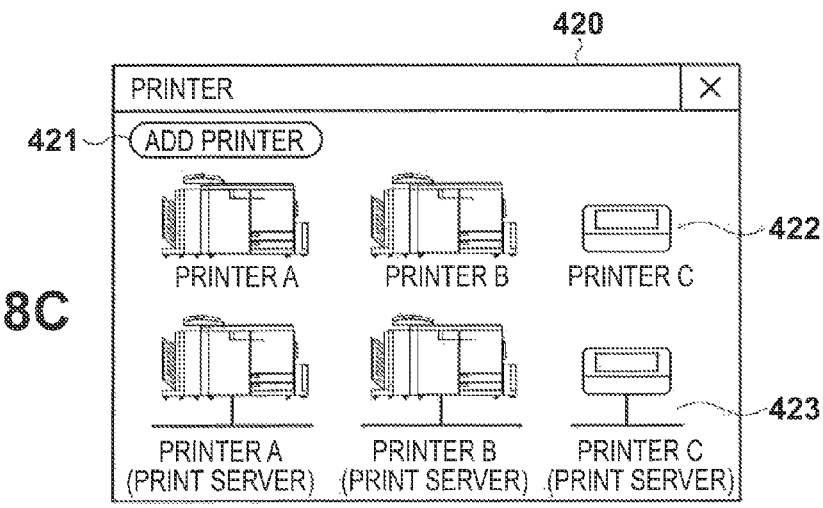

The image output apparatus B 102b and image output apparatus C 102c have been added through these processes. FIG. 8C shows a printer dialog in which a print queue is added. In FIG. 8C, a printer dialog 420, a printer add button 421, and a print queue 422 of registered printer A, printer B, and printer C are displayed. A server print queue 423 newly registered in the above-described steps for printing by printer B and printer C via the print server 103 is further displayed.

[Processing in Print Server]

Figure 6:
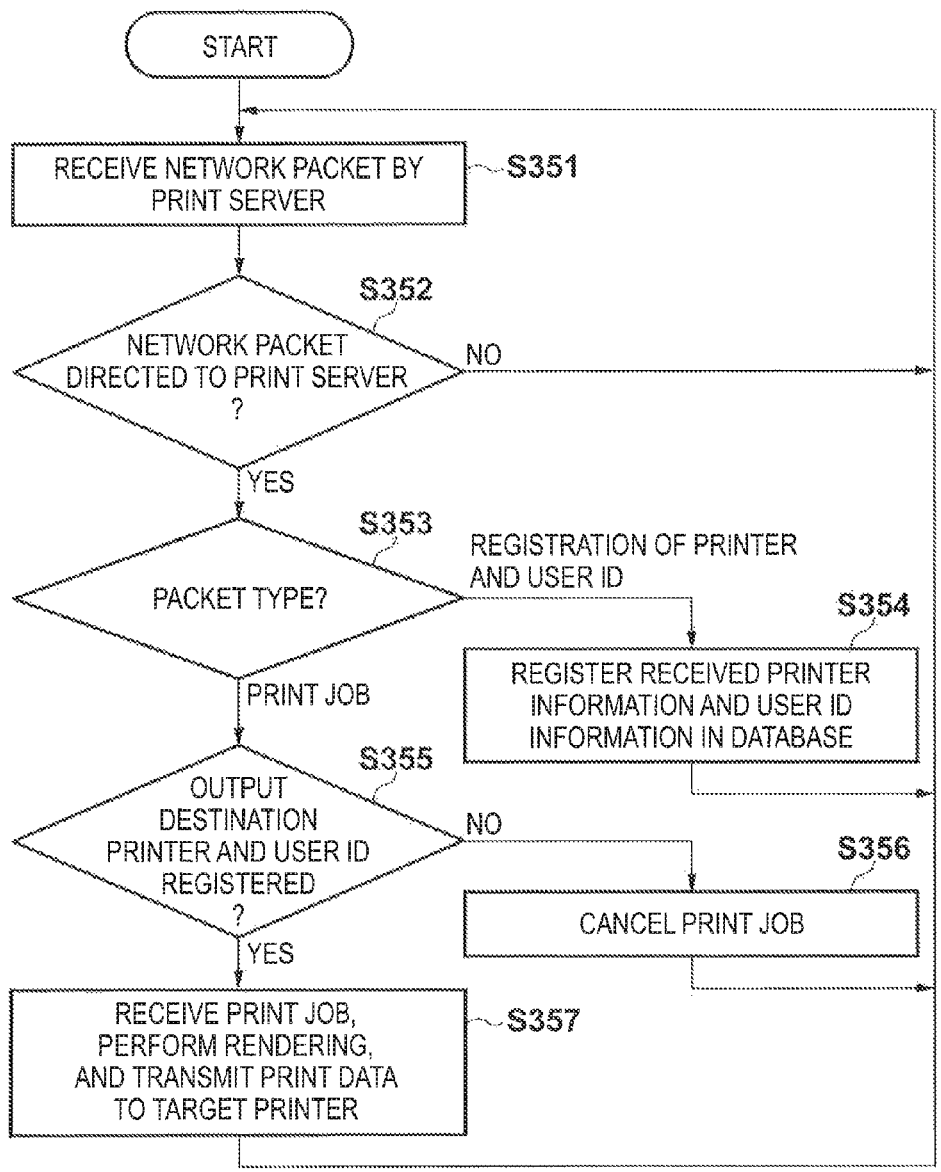
FIG. 6 is a flowchart showing processing in the print server.

Next, processing in the print server 103 will be described with reference to the flowchart of FIG. 6. In step S351, the print server 103 receives a network packet. After receiving the network packet, the process advances to step S352, and the print server 103 determines whether the packet is directed to it. If the packet is not directed to the print server 103 (NO in step S352), the process returns to step S351, and the print server 103 receives a network packet again. If the packet is directed to the print server 103 (YES in step S352), the process advances to step S353, and the print server 103 determines the type of packet. If the type of packet indicates registration of an image output apparatus and user ID, the process advances to step S354. In step S354, the print server 103 registers the received image output apparatus information, that is, information about the print server connection port address of an image output apparatus and the ID of the user of the image output apparatus. This registration is executed by the printer registration program 135 and user registration program 186 of the print server 103. Upon the execution, the image output apparatus information and user information are saved in the database 190 of the print server.

If the type of packet indicates a print job in step S353, the process advances to step S355. In step S355, the print server 103 checks an attribute contained in the print job, and checks whether the image output apparatus serving as the output destination and the user of it have been registered in the database 190. If the image output apparatus and user have not been registered (NO in step S355), the process advances to step S356, and the print server 103 cancels the job. If the image output apparatus and user have been registered (YES in step S355), the process advances to step S357, and the rendering program 189 renders the print job received by the print job reception program 187. Further, the print data transmission program 188 transmits the rendered print data to the image output apparatus 102 serving as the output destination. After that, the process returns to step S351, and the print server 103 waits until it receives a network packet.

[Processing in Image Output Apparatus]

Figure 7:
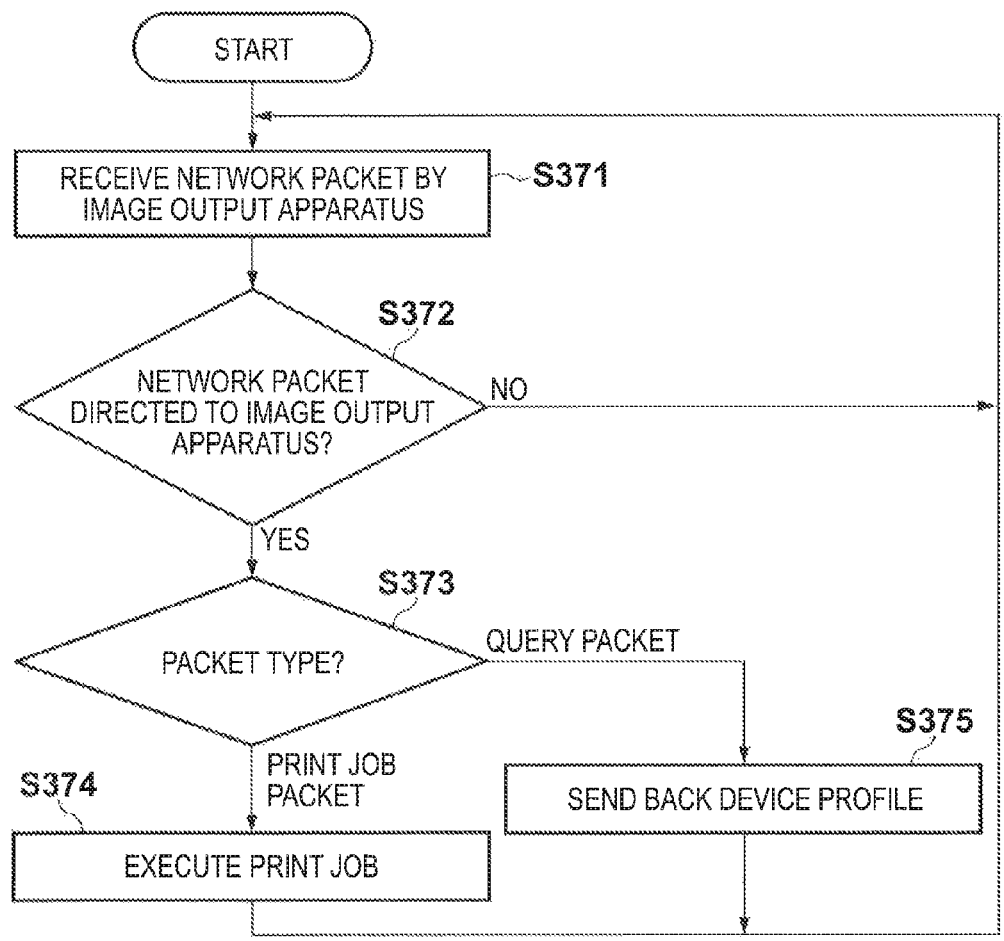
FIG. 7 is a flowchart showing processing in the image output apparatus.

Processing in the image output apparatus 102 will be described with reference to the flowchart of FIG. 7. In step S371, the image output apparatus 102 receives a network packet. After receiving the network packet, the process advances to step S372, and the image output apparatus 102 determines whether the packet is directed to it. If the packet is not directed to the image output apparatus 102 (NO in step S372), the process returns to step S371, and the image output apparatus 102 receives a network packet again.

If the packet is directed to the image output apparatus 102 (YES in step S372), the process advances to step S373, and the image output apparatus 102 determines the type of packet. If the type of packet indicates a query packet, the process advances to step S375. In step S375, the image output apparatus 102 generates the packet of its device profile and sends it back to the inquiry source. If the type of packet indicates a print job packet in step S373, the image output apparatus 102 receives print data and executes the print job in step S374.

By the series of processes, the user can register an image output apparatus of his choice in the print server by only pressing the print server registration button of the print queue of the image output apparatus. When other image output apparatuses exist on a local network, the user can register them together.

<Second Embodiment>

The second embodiment according to the present invention will be described with reference to the accompanying drawings. FIG. 9B and FIGS. 12 to 17 are views for explaining the second embodiment according to the present invention. In the second embodiment, the printing system additionally includes a document server. An image output apparatus which is registered in the print server and is used when the document server and print server cooperate with each other can be easily registered in the document server.

Figure 12:
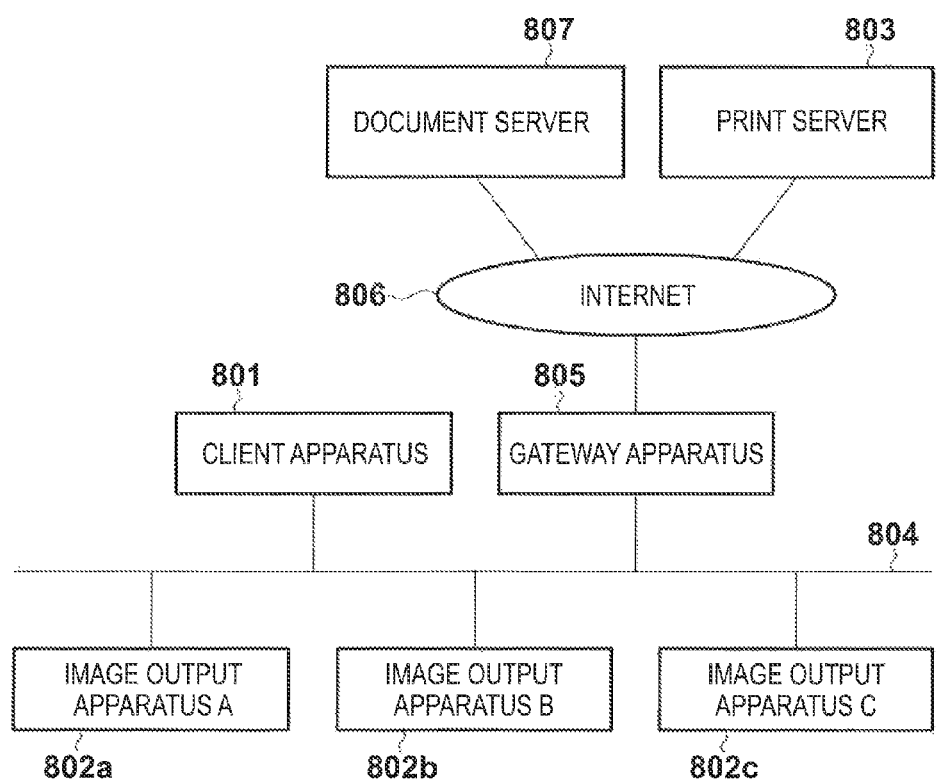
FIG. 12 is a block diagram exemplifying the configuration of a printing system according to the second embodiment.

FIG. 12 is a block diagram showing the schematic configuration of a printing system according to the second embodiment of the present invention. The printing system according to the embodiment includes a client apparatus 801 which is operated by the user, and a plurality of image output apparatuses 302 which receive and output print jobs. The client apparatus 801 and image output apparatuses 802 are connected via a network 804 formed from Ethernet® or the like. The client apparatus 801, a print server 803, and a document server 807 are connected via a gateway apparatus 805 present on the network 804, and the Internet 806.

The image output apparatus 802 receives a print job generated by the client apparatus 801 via the network 804, and prints it. In addition, the image output apparatus 802 can receive even a job from the print server 803 and print it. The document server 807 is a server which provides application services such as editing, management, and printing of a document from the browser or application of the client apparatus 801 via the Internet 806. The document server 807 can perform processing in cooperation with the print server 803.

More specifically, the user refers to a management screen for the document server 807 and registers the image output apparatus 802 registered in the print server 803. Then, the user generates a document using an application service provided by the document server 807, and instructs the image output apparatus 802 registered in the print server 803 to print. The document server 807 transmits the print job to the print server 803. This implements job transmission. The print server 803 renders the received print job, and transmits the print data to the designated image output apparatus 802.

In this way, the document server 807 and print server 803 are used from, the browser of the client apparatus 801. A document held in the document server can therefore be printed.

In FIG. 12, the configuration, apparatuses, and elements except for the document server 807 are the same as those in FIG. 1 described in the first embodiment, and a detailed description of each apparatus with reference to a block diagram will not be repeated.

[Document Server]

Figure 13:
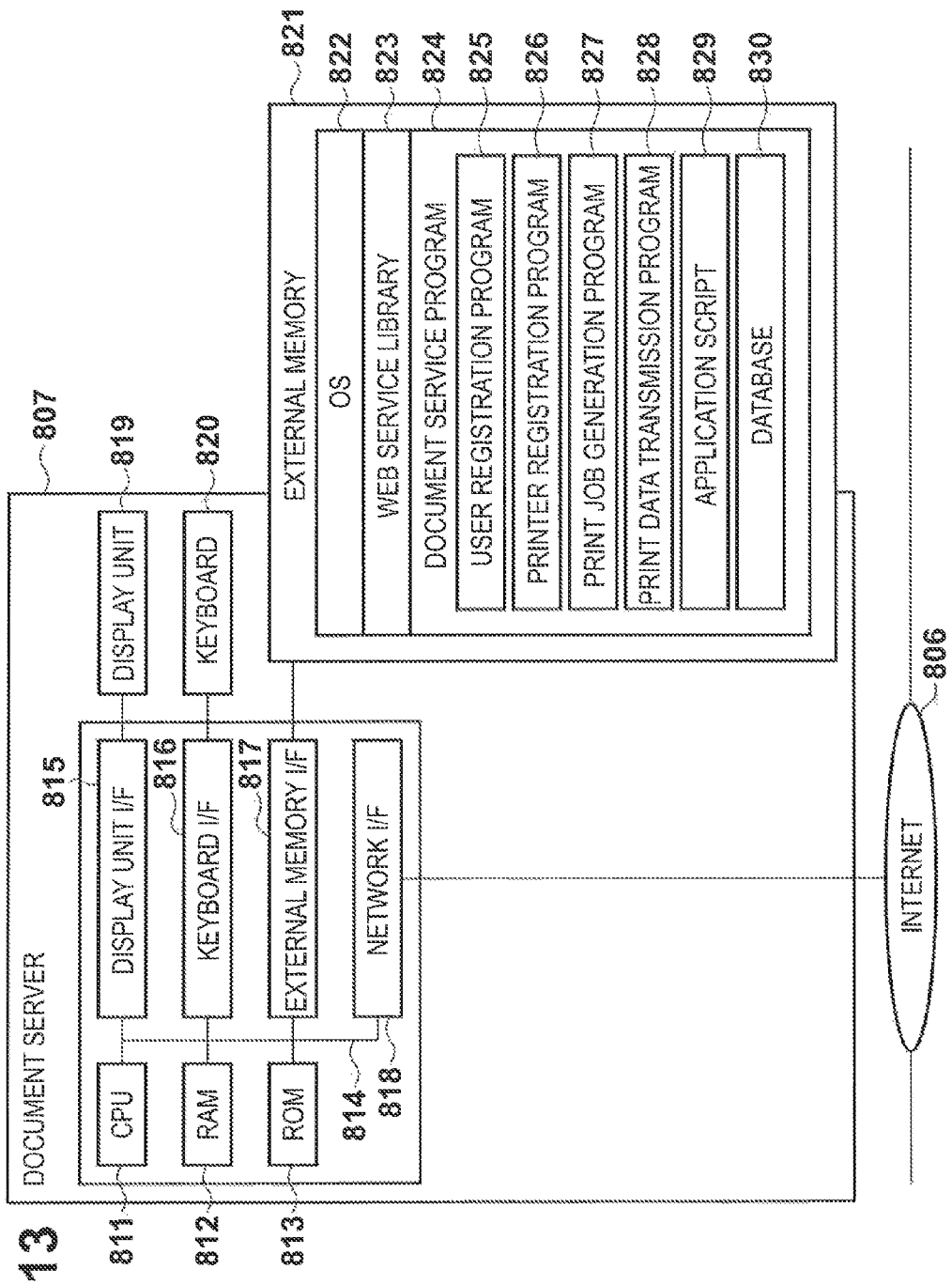
FIG. 13 is a block diagram exemplifying the arrangement of a document server.

The arrangement of the document server 807 will be explained with reference to FIG. 13. In the document server 807, a CPU 811 comprehensively controls devices connected to a system bus 814 in accordance with a program stored in, for example, a RAM 812 serving as a storage unit. The RAM 812 functions even as a main memory, work memory, and the like for the CPU 811. A ROM 813 stores various programs and data. A keyboard I/F 816 controls inputs from a keyboard 820 and a pointing device (for example, mouse: not shown). A display unit I/F 815 controls display on a display unit 819.

An external memory I/F 817 controls access to an external memory 821 such as an HD or SSD. The external memory 821 includes an OS 822, web service library 823, and document service program 824. Further, the external memory 821 functions as a computer-writable/readable storage medium which stores user files, other setting files, and the like as a database 830. The document service program 824 includes a user registration program 825, printer registration program 826, print job generation program 827, print data transmission program 828, and application script 829. A network I/F 818 is connected to the client apparatus 801 and print server 803 via the Internet 806, and performs communication control processing.

[Processing Sequences in System]

Processing sequences in the respective apparatuses will be explained with reference to the flowcharts of FIGS. 14 to 16. Note that registration of a local print queue and server print queue is the same as that in the first embodiment, and a description thereof will not be repeated. Processing concerning the second embodiment will be described.

[Processing in Document Server]

Figure 14:
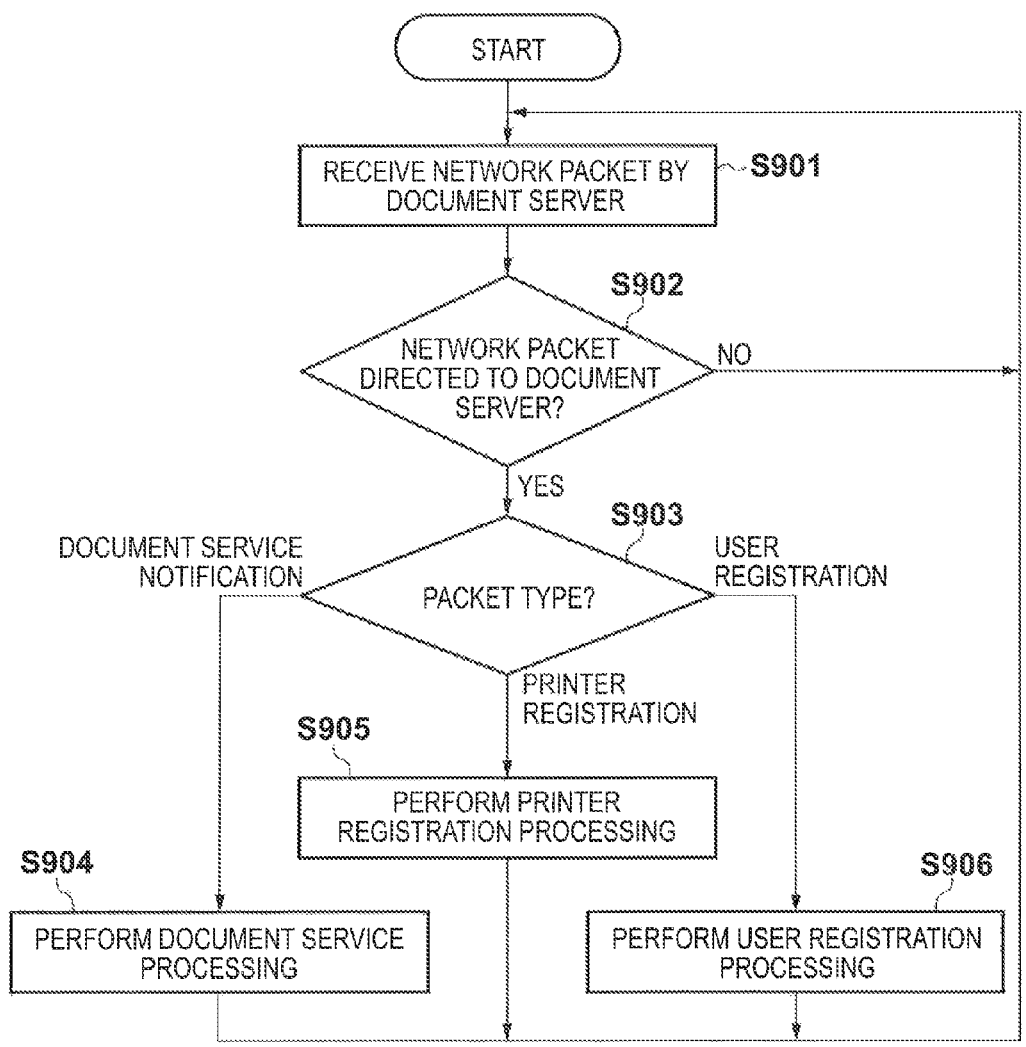
FIG. 14 is a flowchart showing processing in the document server.

FIG. 14 is a flowchart showing processing in she document server 807. In step S901, the document server 607 receives a network packet via the network I/F 818. After receiving the network packet, the document server 807 determines in step S902 whether the received network packet is directed to it. If the packet is not directed to the document server 807 (NO in step S902), the process returns to step S901, and the document server 807 receives a network packet again.

If the network packet is directed to the document server 807 (YES in step S902), the process advances to step S903, and the document server 807 determines the type of network packet. If the received, network packet indicates "document service processing", the process advances to step S904, and the document server 807 performs various document service processes. This document service processing is, for example, a web browser-based application service. In this case, for example, upon accepting a URL page request from the client apparatus 801, the document server 807 transmits an application script, to the client apparatus 801.

If the type of network packet indicates "printer registration" in step S903, the process advances to step S905, and the document server 807 performs printer registration processing. This is executed by the printer registration program 826 saved in the external memory of the document server 807.

If the type of packet indicates "user registration" in step S903, the process advances to step S906, and the document server 807 performs user registration processing. This is executed by the user registration program 825 saved in the external memory 821 of the document server 807. Upon completion of processing corresponding to the type of network packet, the process returns to step S901, and the document server 807 waits until it receives the next network packet.

[Processing in Client Apparatus]

Figure 15:
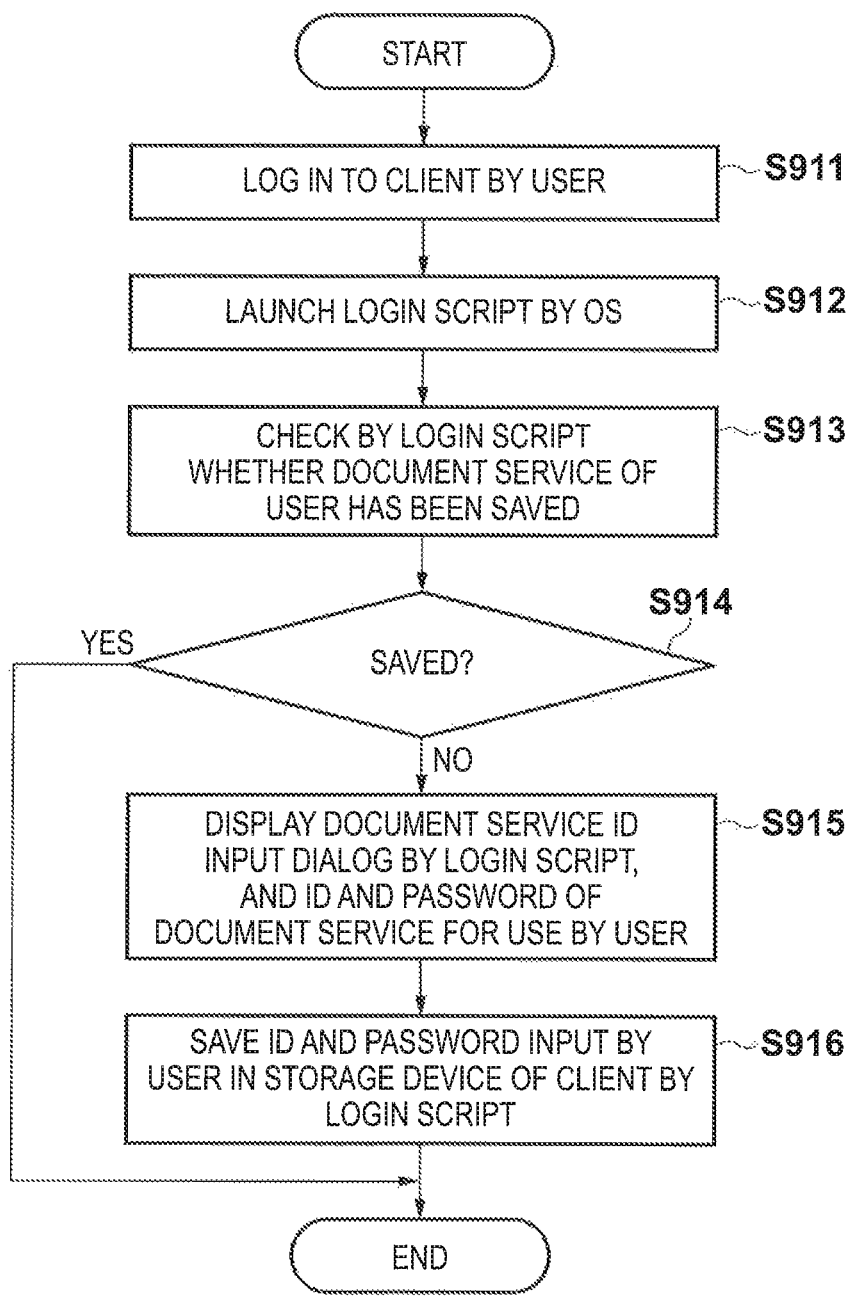
FIG. 15 is a flowchart showing processing in a client apparatus.
Figure 16:
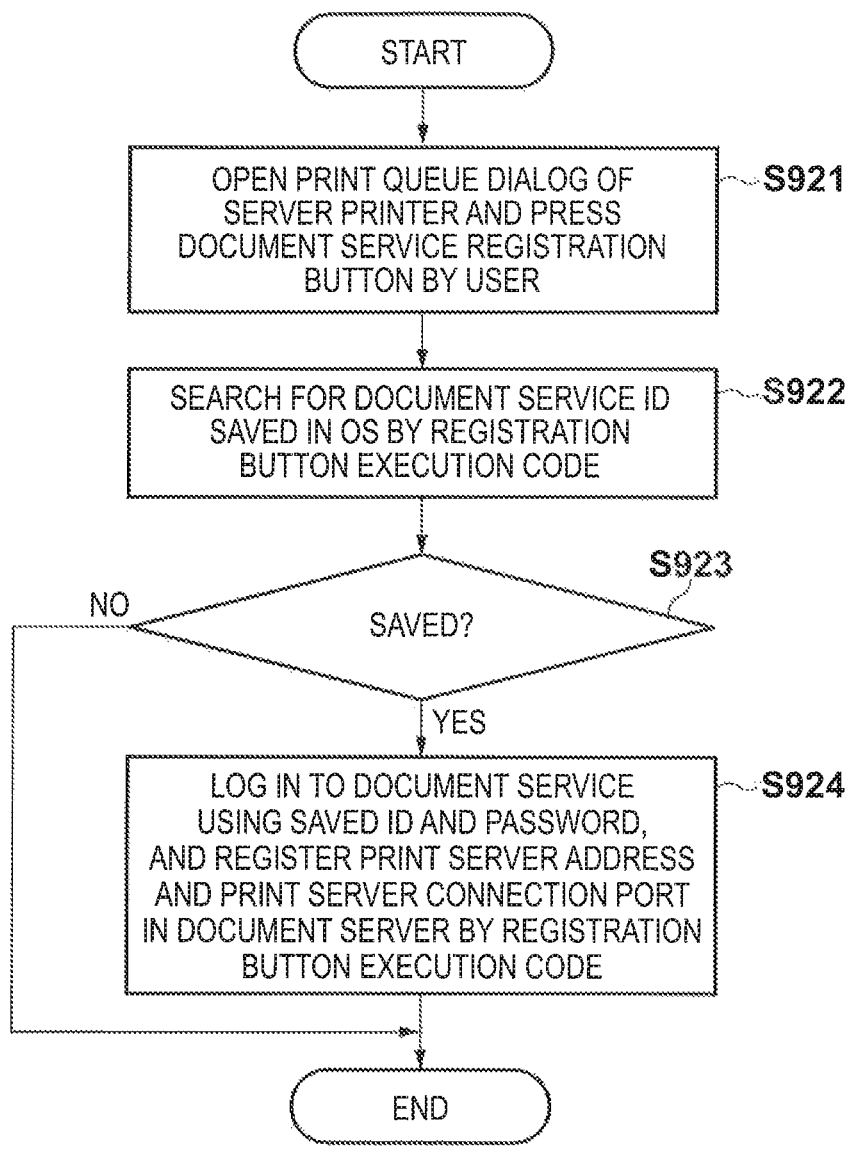
FIG. 16 is a flowchart showing processing in the client apparatus.

FIGS. 15 and 16 are flowcharts for explaining a processing sequence in the client apparatus 801. FIG. 15 shows processing when the user logs in to the OS 822. Processing executed in login is called a login script, and is executed by the OS 822 in login.

In step S911, the user logs in to the OS 822 of the client apparatus 801. In step S912, the OS 822 launches the login script saved in the external memory of the client apparatus 801. In step S913, the launched login script checks whether the document service ID of the logged-in user has already been saved. This information contains, for example, authentication information used to execute the document service. Assume that the document service ID is stored in the external memory of the client apparatus 801 that is accessible by the login script. More specifically, the document service ID is an accessible key or file in the OS register or "/usr" directory. If the document service ID has been saved (YES in step S914), the process ends. If no document service ID has been saved (NO in step S914), the process advances to step S915, and the login script displays a document service ID input dialog on the client apparatus 801.

Figure 17:
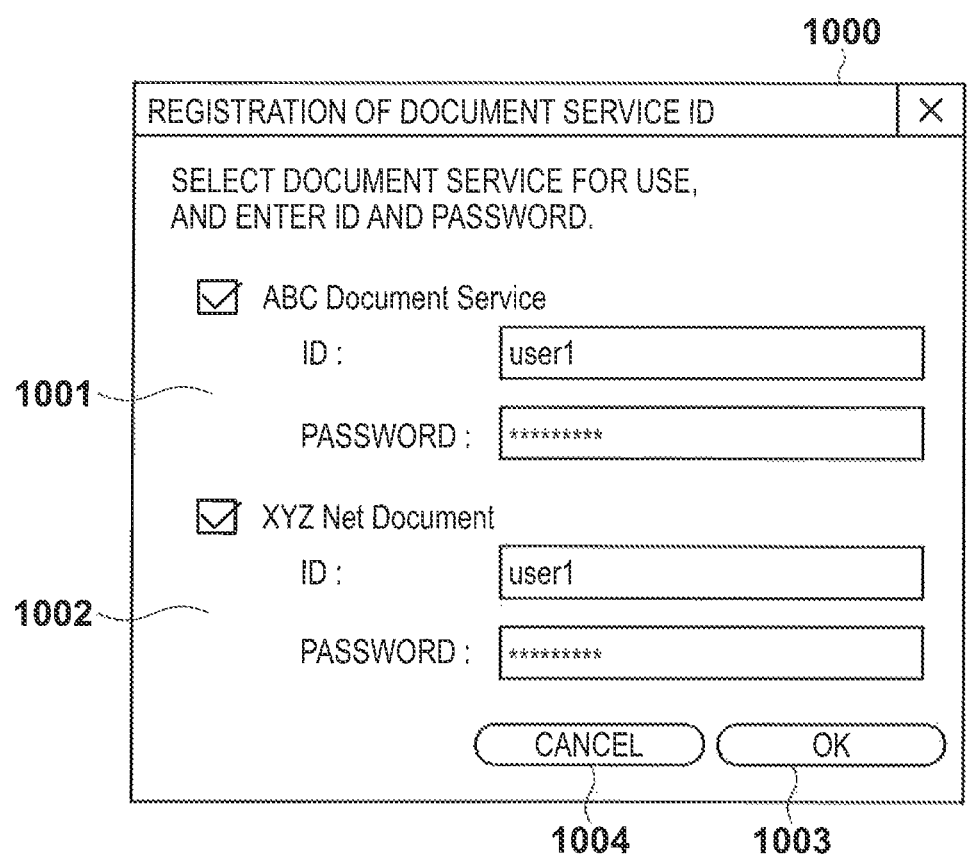
FIG. 17 is a view exemplifying a document service ID input dialog.

FIG. 17 exemplifies the dialog. In FIG. 17, a document service ID registration dialog 1000, and controls 1001 and 1002 each for inputting the login ID and password of a document service are displayed. As for a document service not to be registered, a check box arranged beside the document service name is set "OFF" (that is, unchecked) so that the document service is not registered.

After the end of input to the check box and the controls 1001 and 1002 in document service ID registration, the user presses an OK button 1003. When canceling registration, the user presses a cancel button 1004. In step S916, the login script saves, in the external memory 821 of the client apparatus 801 for each document service, the login ID and password input by the user in step S915. As a result, authentication information containing the login ID and password corresponding to the document service is held.

Figure 9B:
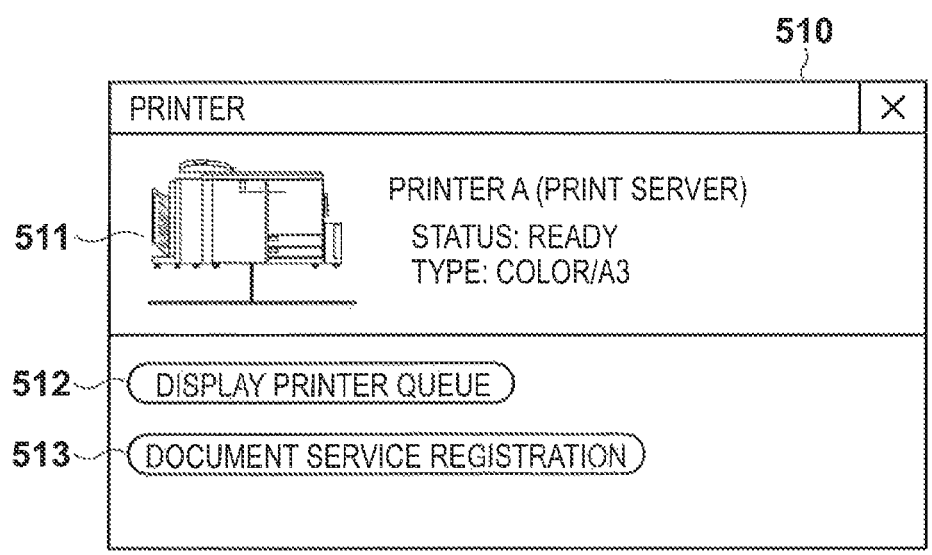

FIG. 16 shows a sequence when the user registers an image output apparatus in the document service of the document server 807 on the client apparatus 801. In step S921, the user opens the print queue dialog of a server print queue on the OS of the client apparatus 801. FIG. 9B exemplifies the print queue dialog of the print server (image output apparatus). In FIG. 9B, a print queue dialog 510 is the print queue dialog of printer A (print server) serving as a server printer.

Summary information 511 is the summary of information about printer A (print server). In this example, the outer appearance of printer A, the printer name "printer A (print server)", a status representing the printing status of the image output apparatus, and the type of image output apparatus are displayed. Note that the summary information 511 is not limited to these pieces of information, and another information acquired from the image output apparatus may be displayed. A display button 512 is a button for displaying a print queue representing the processing status of a print job. A document service registration button 513 is a button for registering an image output apparatus in the document service of the document server 807. By pressing this button, the user registers an output destination.

To register an image output apparatus in the document service in use, the user presses the document service registration button 513. Note that a vendor-specific execution code which is executed upon pressing this button can be defined. By this operation, the execution code is executed. This execution code is provided by, for example, the printer driver.

In step S921, the user presses the document service registration button 513. In response to this instruction, in step S922, the execution code of the document service registration button 513 searches for the login ID and password of the document service that are saved in the OS. If the detected authentication information is not saved (NO in step S923), the process ends. If the authentication information is saved (YES in step S323), the process advances to step S324. In step S924, the execution code of the document service registration button 513 logs in to the document service using the saved login ID and password. By using the web API of the document service or the like, the execution code registers, in the document service, the image output apparatus which is used by the user and registered in the print server. In this case, the user wants to register printer A (print, server), so the execution code registers the address of the print server and the server connection port address information of the image output apparatus. Accordingly, the port is registered in the document service.

By inputting document service information for use, the user can register an image output apparatus of his choice in the document service by only pressing the print queue button.

Aspects of the present invention can also be realized by a computer of a system or apparatus (or device such as a CPU or MPU) that reads out and executes a program recorded on a memory device to perform the functions of the above-described embodiment (s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (for example, computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2011-032632, filed Feb. 17, 2011, which is hereby incorporated by reference herein in its entirety.

What is claimed is:

1. A printing system in which a print server, a client apparatus, and an image output apparatus are connected via a network,
wherein the image output apparatus includes:
a first connection port for local connection and a second connection port for receiving a print job via the print server;
a reply unit configured to send back an address of the second connection port upon receiving an address acquisition request; and
a printing unit configured to print a print job received via the first connection port or the second connection port,
wherein the print server includes:
an image output apparatus registration unit configured to register an image output apparatus serving as a transmission destination of a print job; and
a transmission unit configured to transmit a print job via a designated connection port to the image output apparatus which is set or designated by the print job and registered by the image output apparatus registration unit,
wherein the client apparatus includes a first installer for installing a driver corresponding to the image output apparatus, the first installer being executed to install, in the client apparatus, a first driver and a second installer for installing a second driver,
wherein, in installation by the first installer, the second driver is not installed and a print queue corresponding to the second driver is not displayed in a print queue list,
wherein the installed first driver includes:
a generation unit configured to generate a first print queue to connect to the first connection port of the image output apparatus;
an address acquisition unit configured to transmit the address acquisition request and acquire the address of the second connection port of the image output apparatus; and
an execution unit configured to, upon accepting an instruction to generate a second print queue using the print server as a connection destination, launch the second installer installed with the first driver when installed by the first installer to install the second driver, and generate the second print queue,
wherein the second driver is displayed in the print queue list upon the generation of the second driver, and
wherein the launched second installer generates the second print queue using the address of the second connection port that is acquired by the address acquisition unit.

2. The system according to claim 1, wherein when a default setting of the first print queue has been changed, the execution unit controls the second installer to change a setting of the second print queue to the changed setting of the first print queue.

3. The system according to claim 1, wherein the execution unit includes an acquisition unit configured to search for an image output apparatus on a local network and acquire information of a connection port of the image output apparatus connected to the local network when the second installer generates a second print queue, and
wherein when the acquisition unit detects an image output apparatus having a second connection port, the execution unit controls to generate a second print queue using an address of the second connection port.

4. The system according to claim 3, wherein when the acquisition unit detects another image output apparatus having no second connection port, the execution unit controls to generate a second print queue using an address of a second connection port of a predetermined image output apparatus having the second connection port, and
wherein the image output apparatus further includes a transfer unit configured to, upon receiving a print job to the another image output apparatus having no second connection port via the second connection port of the image output apparatus, transfer the print job to the another image output apparatus having no second connection port.

5. The system according to claim 1, wherein the print server further includes a holding unit configured to hold information of a user who can use the image output apparatus registered by the image output apparatus registration unit,
wherein the execution unit further includes a comparison unit configured to acquire authentication information of a user who has logged in to the client apparatus and issues the generation instruction, and compare a system of the authentication information with a system of the information of the user that is held by the holding unit of the print server,
wherein when the systems coincide with each other, the execution unit controls the holding unit to hold the authentication information, and
wherein when the systems differ from each other, the execution unit prompts the user to input new authentication information, and controls the holding unit to hold the new authentication information.

6. The system according to claim 5, wherein when the comparison unit determines that the systems coincide with each other, the execution unit controls the holding unit of the print server to hold authentication information, held in the client apparatus, of another user who can use the image output apparatus.

7. The system according to claim 1, wherein the printing system further comprises a document server, and
wherein the document server includes:
an output destination registration unit configured to register an image output apparatus registered in the print server; and
job transmission unit configured to, upon receiving a print instruction, transmit, to the print server, a print job containing information of an image output apparatus designated as an output designation among image output apparatuses registered by the output destination registration unit.

8. The system according to claim 7, wherein the installed second driver further includes a designation unit configured to, when issuing the print instruction to the document server, designate the print server as a transmission destination of a print job, and designate a second connection port of an image output apparatus serving as an output destination of the print job.

9. The system according to claim 7, wherein the installed second driver includes a port registration unit configured to control the output destination registration unit of the document server to register information of the second connection port corresponding to the registered image output apparatus.

10. The system according to claim 9, wherein the installed second driver further includes a unit configured to inquire authentication information in the document server when a user logs in, and wherein when registering the second connection port, the port registration unit logs in to the document server using the authentication information.

11. A control method for a printing system in which a print server, a client apparatus, and an image output apparatus are connected via a network, the image output apparatus including a first connection port for local connection and a second connection port for receiving a print job via the print server, the control method comprising:

in the image output apparatus,
sending back an address of the second connection port upon receiving an address acquisition request; and
printing a print job received via the first connection port or the second connection port, in the print server,
registering an image output apparatus serving as a transmission destination of a print job; and
transmitting a print job via a designated connection port to the image output apparatus which is set or designated by the print job and registered in the registering step, and in the client apparatus including a first installer for installing a driver corresponding to the image output apparatus, installing, by the first installer, in the client apparatus, a first driver and a second installer for installing a second driver, wherein, in installation by the first installer, the second driver is not installed and a print queue corresponding to the second driver is not displayed in a print queue list, by the installed first driver,
generating a first print queue to connect to the first connection port of the image output apparatus;
transmitting the address acquisition request and acquiring the address of the second connection port of the image output apparatus;
upon accepting an instruction to generate a second print queue using the print server as a connection destination, launching the second installer installed with the first driver when installed by the first installer to install the second driver, and generating the second print queue;

wherein the second driver is displayed in the print queue list upon the generation of the second driver, and causing the launched second installer to generate the second print queue using the acquired address of the second connection port.

* * * * *